United States Patent
Takenaka et al.

(10) Patent No.: US 11,066,523 B2
(45) Date of Patent: Jul. 20, 2021

(54) PHOTOCHROMIC POLYROTAXANE COMPOUND AND CURABLE COMPOSITION COMPRISING THE PHOTOCHROMIC POLYROTAXANE COMPOUND

(71) Applicant: TOKUYAMA CORPORATION, Shunan (JP)

(72) Inventors: Junji Takenaka, Shunan (JP); Junji Momoda, Shunan (JP); Takayoshi Kawasaki, Shunan (JP); Takao Noguchi, Shunan (JP); Yasutomo Shimizu, Shunan (JP); Masayuki Miyazaki, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 0 days.

(21) Appl. No.: 16/621,634

(22) PCT Filed: Jun. 18, 2018

(86) PCT No.: PCT/JP2018/023091
§ 371 (c)(1),
(2) Date: Dec. 11, 2019

(87) PCT Pub. No.: WO2018/235771
PCT Pub. Date: Dec. 27, 2018

(65) Prior Publication Data
US 2020/0172681 A1    Jun. 4, 2020

(30) Foreign Application Priority Data
Jun. 20, 2017   (JP) .............................. JP2017-120591

(51) Int. Cl.
*G02B 5/23*       (2006.01)
*C08G 83/00*      (2006.01)
*G02C 7/10*       (2006.01)
*C08B 37/16*      (2006.01)

(52) U.S. Cl.
CPC ............ *C08G 83/007* (2013.01); *G02B 5/23* (2013.01); *G02C 7/102* (2013.01); *C08B 37/0015* (2013.01)

(58) Field of Classification Search
None
See application file for complete search history.

(56) References Cited

U.S. PATENT DOCUMENTS 8,066,917 B2   11/2011   Nagoh et al.
8,663,508 B2   3/2014   Takenaka et al.
(Continued)

FOREIGN PATENT DOCUMENTS

WO   WO 03/011967 A1    2/2003
WO   WO 2009/075388 A1  6/2009
(Continued)

OTHER PUBLICATIONS

Construction of photoswitchable rotaxanes and catenanes containing dithienylene fragments, Org. Biomol. Chem. , 2015, 13, 7313 to Li et al. (Year: 2015).*
(Continued)

*Primary Examiner* — Peter A Salamon
(74) *Attorney, Agent, or Firm* — Birch, Stewart, Kolasch & Birch, LLP

(57) ABSTRACT

A photochromic polyrotaxane compound which comprises an axial molecule and a plurality of cyclic molecules clathrating the axial molecule, wherein at least one side chain containing a photochromic moiety is bonded to at least one of the cyclic molecules, and a curable composition comprising the photochromic polyrotaxane compound and a polymerizable compound.

19 Claims, 1 Drawing Sheet

(56) References Cited

U.S. PATENT DOCUMENTS

| | | | |
|---|---|---|---|
| 9,316,765 B2 | 4/2016 | Mori et al. | |
| 9,482,787 B2 | 11/2016 | Kawato et al. | |
| 9,977,161 B2 | 5/2018 | Momoda et al. | |
| 10,125,309 B2 | 11/2018 | Shimizu et al. | |
| 2016/0222285 A1* | 8/2016 | Shimizu | C08F 290/10 |
| 2018/0030341 A1* | 2/2018 | Shimizu | G02B 5/23 |
| 2018/0244931 A1 | 8/2018 | Mori et al. | |

FOREIGN PATENT DOCUMENTS

| | | |
|---|---|---|
| WO | WO 2011/125956 A1 | 10/2011 |
| WO | WO 2012/176439 A1 | 12/2012 |
| WO | WO 2013/099640 A1 | 7/2013 |
| WO | WO 2015/068798 A1 | 5/2015 |
| WO | WO 2017/038957 A1 | 3/2017 |

OTHER PUBLICATIONS

International Preliminary Report on Patentability and English Translation of Written Opinion of the International Searching Authority for PCT/JP2018/023091 (Forms PCT/IB/373 and PCT/ISA/237), dated Dec. 24, 2019.

International Search Report for PCT/JP2018/023091 (PCT/ISA/210) dated Jul. 24, 2018.

Li et al., "Construction of photoswitchable rotaxanes and catenanes containing dithienylethene fragments", Organic & Biomolecular Chemistry, 2015, vol. 13 (26), pp. 7313-7322.

Shilova et al., "Synthesis of new [2]rotaxane including a macrocyclic receptor and a photochromic unit", Tetrahedron Letters, 2008, vol. 49, No. 21, pp. 3453-3457.

Written Opinion of the International Searching Authority for PCT/JP2018/023091 (PCT/ISA/237) dated Jul. 24, 2018.

Zhang et al., "Altering intercomponent interactions in a photochromic multi-state [2]rotaxane", Organic & Biomolecular Chemistry, 2011, vol. 9(11), pp. 4051-4056.

Extended European Search Report, dated Feb. 12, 2021, for corresponding European Application No. 18821410.0.

Sun et al., "Functional Metal-Bipyridinium Frameworks: Self-Assembly and Applications," Dalton Transactions, vol. 44, No. 44, 2015 (Jan. 1, 2015), pp. 19041-19055, XP055772542.

Wei et al., "Reversible Formation of a Poly[3]rotaxane Based on Photo Dimerization of an Anthracene-capped [3]rotaxane," Chem. Commun., vol. 50, No. 91, 2014 (Jan. 1, 2014), pp. 14105-14108, XP055772540.

* cited by examiner

[FIG. 1]
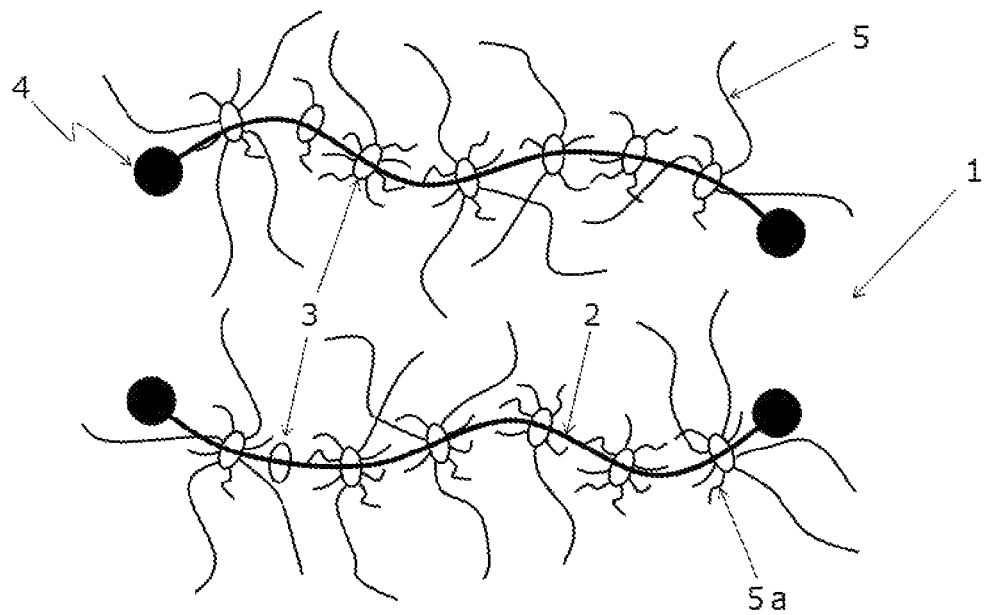
[FIG. 2]
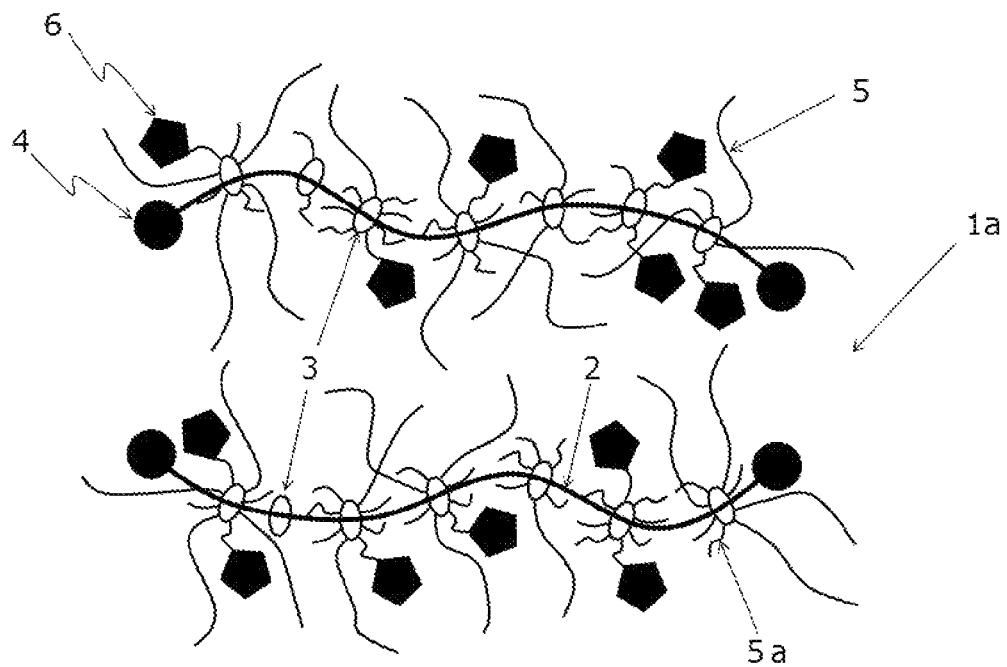

PHOTOCHROMIC POLYROTAXANE COMPOUND AND CURABLE COMPOSITION COMPRISING THE PHOTOCHROMIC POLYROTAXANE COMPOUND

TECHNICAL FIELD

The present invention relates to a novel photochromic polyrotaxane compound and a curable composition comprising the photochromic polyrotaxane compound.

BACKGROUND ART

Photochromic compounds typified by naphthopyran compounds, fulgide compounds and spirooxazine compounds have a characteristic feature (photochromic properties) that they change their colors swiftly upon exposure to light including ultraviolet light such as sunlight or light from a mercury lamp and return to their original colors when they are put in the dark by stopping their exposure to light and are used for various purposes, especially optical materials, making use of this characteristic feature.

For example, photochromic spectacle lenses which are provided with photochromic properties by using a photochromic compound function as sunglasses which are quickly colored outdoors where they are irradiated with light including ultraviolet light such as sunlight and as ordinary transparent eyeglasses which are faded indoors where there is no irradiation, and demand for the photochromic spectacle lenses is growing nowadays.

To provide photochromic properties to an optical material, a photochromic compound is generally used in combination with a plastic material. Stated more specifically, the following means are known.
(a) A method in which a photochromic compound is dissolved in a polymerizable monomer and the resulting solution is polymerized to directly mold an optical material such as a lens. This method is called "kneading method".
(b) A method in which a resin layer containing a photochromic compound dispersed therein is formed on the surface of a plastic molded article such as a lens by coating or cast polymerization. This method is called "lamination method".
(c) A method in which two optical sheets are bonded together by means of an adhesive layer formed from an adhesive resin containing a photochromic compound dispersed therein. This method is called "binder method".

For optical materials such as optical articles provided with photochromic properties, the following properties are further required.
(I) The degree of coloration at a visible light range before ultraviolet light is applied (initial coloration) should be low.
(II) The degree of coloration upon exposure to ultraviolet light (color optical density) should be high.
(III) The speed from the stoppage of the application of ultraviolet light to the time when the material returns to its original state (fading speed) should be high.
(IV) The repeat durability of a reversible function between color development and fading should be high.
(V) Storage stability should be high.
(VI) The material should be easily molded into various shapes.
(VII) Photochromic properties should be provided without the reduction of mechanical strength.

Therefore, for the manufacture of optical materials having photochromic properties by the above-described means (a), (b) and (c), various proposals have been made to satisfy the above requirements.

The above-described kneading method has an advantage that photochromic plastic lenses can be mass-produced at a low cost by using glass molds. Most of photochromic plastic lenses are now manufactured by this method (refer to Patent Document 1 and Patent Document 2). As strength is required for a lens substrate in the conventional kneading method, it is necessary to enhance the mechanical strength of a matrix resin containing a photochromic compound dispersed therein. Therefore, it is difficult to develop excellent photochromic properties. That is, since the degree of freedom of the molecule of the photochromic compound existent in the matrix resin becomes low, a photochromic reversible reaction may be impaired.

As for this kneading method, Patent Document 1 discloses a technique for adding a photochromic compound to a monomer composition comprising an isocyanate monomer and a thiol monomer. Patent Document 2 discloses a photochromic curable composition comprising a specific (meth) acrylic polymerizable monomer and a photochromic compound.

Although photochromic lenses molded by polymerizing and curing these compositions have high mechanical strength, there is still room for the improvement of photochromic properties, especially fading speed.

Meanwhile, in the lamination method and the binder method, photochromic properties are developed with a thin layer formed on the surface of a substrate as compared with the above-described kneading method (refer, for example, to Patent Document 3, Patent Document 4 and Patent Document 5). Therefore, to develop the same color optical density as that of the kneading method, a photochromic compound must be dissolved at a high concentration. In this case, according to the type of a photochromic compound, there occurs a problem such as unsatisfactory solubility or precipitation during storage. Further, since the layer which develops photochromic properties is thin, the photochromic compound may be inferior in durability.

Patent Document 3 discloses that a photochromic curable composition is applied to a plastic lens by spin coating and optically cured to form a photochromic coating layer (this lamination method is also called "coating method"). Patent Document 4 discloses a method in which a space is secured between a plastic lens and a glass mold by using a member such as an elastomer gasket, adhesive tape or spacer and a photochromic curable composition is poured into this space and polymerized and cured to form a photochromic layer (to be also referred to as "two-stage polymerization method" hereinafter). Further, Patent Document 5 discloses that a laminate sheet is manufactured by bonding together transparent carbonate sheets by means of a polyurethane resin adhesive layer containing a photochromic compound (binder method).

However, photochromic properties need to be developed with a thin layer comprising a photochromic compound in all of Patent Documents 3 to 5. Therefore, when a photochromic compound having low solubility is used, color optical density tends to become low and further there is room for the improvement of the durability of the photochromic compound.

For the above improvements, a photochromic curable composition comprising a novel compound is now under study (refer to Patent Document 6). Patent Document 6 discloses a photochromic curable composition comprising a polyrotaxane compound. This polyrotaxane compound is a compound having a composite molecular structure composed of an axial molecule and a plurality of cyclic molecules clathrating the axial molecule. In Patent Document 6, a cured body having excellent mechanical properties, moldability, color optical density and fading speed is obtained by blending a photochromic compound with the polyrotaxane compound.

PRIOR ART DOCUMENTS

Patent Documents

Patent Document 1: WO2012/176439 pamphlet
Patent Document 2: WO2009/075388 pamphlet
Patent Document 3: WO2011/125956 pamphlet
Patent Document 4: WO2003/011967 pamphlet
Patent Document 5: WO2013/099640 pamphlet
Patent Document 6: WO2015/068798 pamphlet

DISCLOSURE OF THE INVENTION

Problem to be Solved by the Invention

In Patent Document 6, an excellent photochromic curable composition and an excellent cured body are obtained by blending a polyrotaxane compound. However, it is recently desired that more excellent photochromic properties, especially color optical density and fading speed, should be developed. Since color optical density and fading speed have a trade-off relationship basically, it is not easy to obtain both of them at the same time.

It is an object of the present invention to provide a cured body capable of improving fading speed while retaining high color optical density, a photochromic compound capable of obtaining the cured body and a curable composition comprising the photochromic compound.

Means for Solving the Problem

The inventors of the present invention conducted intensive studies to solve the above problems and made various studies by paying attention to a polyrotaxane compound. The reason that excellent photochromic properties are obtained from a photochromic curable composition comprising a polyrotaxane compound is assumed as follows. That is, as the cyclic molecules of a polyrotaxane can slide over an axial molecule, a space is formed around the cyclic molecules. It is considered that the reversible structural change of a photochromic compound occurs swiftly due to this space with the result of obtaining improved fading speed and improved color optical density. Further, it is considered that the polyrotaxane compound has cyclic molecules into which side chains have been introduced, thereby contributing to the quick occurrence of the reversible structural change of the photochromic compound existent in the vicinity of the side chains having high flexibility.

However, in a prior art method in which a curable composition is obtained by mixing another polymerizable compound with a polyrotaxane compound and blending a photochromic compound with the mixture, there is room for the improvement of the following point.

That is, as the amount of the polyrotaxane compound decreases, the probability that the photochromic compound is existent in the vicinity of the polyrotaxane compound becomes low naturally. Although the amount of the polyrotaxane compound should be increased to prevent this, as the viscosity of the polyrotaxane compound is generally extremely high, it is difficult to handle it in the manufacture of a lens. When the inventors of the present invention conducted studies to solve this problem, they found that photochromic properties can be maximized by always arranging the photochromic compound in the vicinity of the polyrotaxane compound. The present invention was accomplished based on this finding.

That is, according to the present invention, there is provided (1) a photochromic polyrotaxane compound (may be simply referred to as "component (A)" hereinafter) which is a polyrotaxane compound comprising an axial molecule and a plurality of cyclic molecules clathrating the axial molecule, wherein a side chain containing a photochromic moiety is bonded to at least one of the cyclic molecules.

In the present invention, the above polyrotaxane is a molecular complex having a structure that an axial molecule passes through the inside of each of the rings of a plurality of cyclic molecules, a bulky group is bonded to both ends of the axial molecule, and the cyclic molecules cannot be removed from the axial molecule due to steric hindrance. The molecular complex like the polyrotaxane is generally called "supramolecule".

The photochromic curable composition of the present invention can take the following preferred modes.

(2) The photochromic polyrotaxane compound (component (A)) in the above paragraph (1), wherein a side chain containing a polymerizable group is bonded to at least one of the cyclic molecules.

(3) The photochromic polyrotaxane compound in the above paragraph (1) or (2), wherein the side chain containing a photochromic moiety has at least an ether bond.

(4) The photochromic polyrotaxane compound in any one of the above paragraphs (1) to (3), wherein the group containing a polymerizable group has at least an ether bond.

(5) The photochromic polyrotaxane compound in any one of the above paragraphs (1) to (4), wherein the cyclic molecules are cyclodextrin rings.

(6) The photochromic polyrotaxane compound in any one of the above paragraphs (1) to (5), wherein the axial molecule includes a chain-like main chain and bulky groups at both ends, the chain-like main chain is formed from polyethylene glycol, and the bulky groups at both ends are adamantly groups.

(7) The photochromic polyrotaxane compound in any one of the above paragraphs (1) to (6), wherein the photochromic moiety has at least one structure selected from the group consisting of naphthopyran, spirooxazine, spiropyran, fulgide, fulgimide and diarylethene.

(8) The photochromic polyrotaxane compound in any one of the above paragraphs (1) to (7), wherein the photochromic moiety is indeno[2,1-f]naphtho[1,2-b]pyran.

(9) The photochromic polyrotaxane compound in any one of the above paragraphs (1) to (8), wherein the polymerizable group is at least one group selected from the group consisting of acrylic group, methacrylic group, allyl group, vinyl group, 4-vinylphenyl group, epoxy group, episulfide group, thietanyl group, OH group, SH group, $NH_2$ group, NCO group and NCS group.

(10) The photochromic polyrotaxane compound in any one of the above paragraphs (1) to (9), wherein the side chain containing a photochromic moiety is divalent group represented by the following formula (1):

[CF 1]

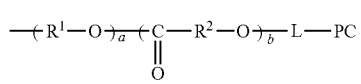

(1)

wherein PC is a photochromic group, $R^1$ is a linear or branched alkylene group having 2 to 8 carbon atoms, $R^2$ is a linear or branched alkylene group having 2 to 8 carbon atoms, linear or branched alkylene group having an acetyl group branch and 3 to 8 carbon atoms, or linear or branched alkylene group having an ether bond and 3 to 8 carbon atoms, L is represented by the following formula (2):

[CF 2]

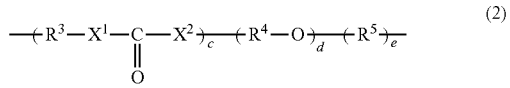
(2)

wherein $R^3$ is a single bond, linear or branched alkylene group having 1 to 20 carbon atoms, cycloalkyl group having 3 to 12 carbon atoms, or aromatic group having 6 to 12 carbon atoms, $R^4$ is a linear or branched alkylene group having 1 to 20 carbon atoms, cycloalkyl group having 3 to 12 carbon atoms, aromatic group having 6 to 12 carbon atoms, or dialkylsilyl group having a linear or branched alkyl group with 1 to 20 carbon atoms, $R^5$ is a linear or branched alkylene group having 1 to 20 carbon atoms, cycloalkyl group having 3 to 12 carbon atoms, or aromatic group having 6 to 12 carbon atoms, $X^1$ and $X^2$ are each independently a single bond, O or NH, "c" is an integer of 0 to 50, "d" is an integer of 0 to 50, "e" is an integer of 0 or 1, when "c" is 2 or more, a "c" number of divalent groups may be the same or different, and when "d" is 2 or more, a "d" number of divalent groups may be the same or different, "a" is an integer of 1 to 50, "b" is an integer of 0 to 50, when "a" is 2 or more, an "a" number of divalent groups may be the same or different, and when "b" is 2 or more, a "b" number of divalent groups may be the same or different.

(11) The photochromic polyrotaxane compound in any one of the above paragraphs (2) to (10), wherein the side chain containing a polymerizable group is represented by the following formula (3):

[CF 3]

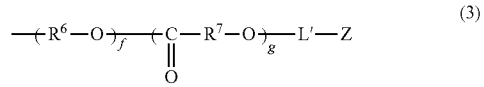
(3)

wherein Z is a polymerizable group, $R^6$ is a linear or branched alkylene group having 2 to 8 carbon atoms, $R^7$ is a linear or branched alkylene group having 2 to 8 carbon atoms, linear or branched alkylene group having an acetyl group branch and 3 to 8 carbon atoms, or linear or branched alkylene group having an ether bond and 3 to 8 carbon atoms, L' is divalent group represented by the following formula (2'):

[CF 4]

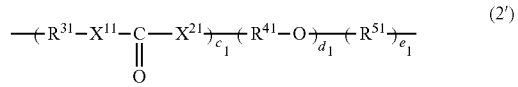
(2')

wherein $R^{31}$ is a single bond, linear or branched alkylene group having 1 to 20 carbon atoms, cycloalkyl group having 3 to 12 carbon atoms, or aromatic group having 6 to 12 carbon atoms, $R^{41}$ is a linear or branched alkylene group having 1 to 20 carbon atoms, cycloalkyl group having 3 to 12 carbon atoms, aromatic group having 6 to 12 carbon atoms, or dialkylsilyl group having a linear or branched alkyl group with 1 to 20 carbon atoms, $R^{51}$ is a linear or branched alkylene group having 1 to 20 carbon atoms, cycloalkyl group having 3 to 12 carbon atoms, or aromatic group having 6 to 12 carbon atoms, $X^{11}$ and $X^{21}$ are each independently a single bond, O or NH, "$c_1$" is an integer of 0 to 50, "$d_1$" is an integer of 0 to 50, "$e_1$" is an integer of 0 or 1, when "$c_1$" is 2 or more, a "$c_1$" number of divalent groups may be the same or different, and when "$d_1$" is 2 or more, a "$d_1$" number of divalent groups may be the same or different, "f" is an integer of 1 to 50, "g" is an integer of 0 to 50, when "f" is 2 or more, an "f" number of divalent groups may be the same or different, and when "g" is 2 or more, a "g" number of divalent groups may be the same or different.

(12) The photochromic polyrotaxane compound in any one of the above paragraphs (1) to (10), wherein the cyclic molecules are cyclodextrin rings, 1 to 100% of the side chains bonded to the cyclodextrin rings contain the photochromic moiety, and 0 to 99% of the side chains have the polymerizable group.

(13) A curable composition comprising the photochromic polyrotaxane compound in any one of the above paragraphs (1) to (12) and a polymerizable compound other than the photochromic polyrotaxane compound.

(14) The curable composition in the above paragraph (13), wherein the polymerizable compound other than the photochromic polyrotaxane compound is a compound having at least one radically polymerizable group selected from the group consisting of acrylic group, methacrylic group, allyl group, vinyl group and 4-vinylphenyl group.

(15) The curable composition in the above paragraph (13), wherein the polymerizable compound other than the photochromic polyrotaxane compound is a compound having at least one polymerizable group selected from the group consisting of epoxy group, episulfide group and thietanyl group.

(16) The curable composition in the above paragraph (13), wherein the polymerizable compound other than the photochromic polyrotaxane compound is a compound having at least one polymerizable group selected from the group consisting of OH group, SH group, $NH_2$ group, NCO group and NCS group.

(17) A photochromic cured body obtained by curing the photochromic polyrotaxane compound in any one of the above paragraphs (2) to (12).

(18) A photochromic cured body obtained by curing the curable composition in any one of the above paragraphs (13) to (16).

Effect of the Invention

The photochromic polyrotaxane compound of the present invention exhibits excellent photochromic properties. Further, even when a polymerizable compound other than the photochromic polyrotaxane compound is contained, a cured body exhibiting excellent photochromic properties such as optical color density and fading speed can be obtained.

BRIEF DESCRIPTION OF THE DRAWINGS

FIG. 1 This is a schematic diagram showing the molecular structure of a polyrotaxane.

FIG. 2 This is a schematic diagram showing the molecular structure of the photochromic polyrotaxane compound of the present invention.

BEST MODE FOR CARRYING OUT THE INVENTION

The present invention is a photochromic polyrotaxane compound which is a polyrotaxane compound comprising an axial molecule and a plurality of cyclic molecules clathrating the axial molecule, wherein a side chain containing a photochromic moiety is bonded to at least one of the cyclic molecules.

Further, the present invention is a curable composition obtained by blending a polymerizable compound other than the photochromic polyrotaxane compound with the photochromic polyrotaxane compound. A detailed description is given of the present invention.

(Polyrotaxane Skeleton)

A polyrotaxane is a known compound, and a polyrotaxane molecule represented by "1" as a whole has a composite molecular structure formed by a chain axial molecule "2" and cyclic molecules "3" as shown in FIG. 1. That is, a plurality of the cyclic molecules "3" clathrate the chain axial molecule "2", and the axial molecule "2" passes through the inside of each of the rings of the cyclic molecules "3". Therefore, the cyclic molecules "3" can freely slide over the axial molecule "2". A bulky terminal group "4" is formed at both ends of the axial molecule "2" to prevent the cyclic molecules "3" from falling off from the axial molecule "2".

That is, it is considered that, since the cyclic molecules "3" can slide over the axial molecule "2" as described above, a space which can allow for the reversible reaction of the photochromic compound is secured, thereby making it possible to obtain high color optical density and high fading speed. It is also considered that, since a side chain having a photochromic moiety is bonded to cyclic molecules, the probability that the photochromic moiety is existent in the space becomes high, thereby making it possible to develop excellent photochromic properties.

In the photochromic polyrotaxane compound used in the present invention, various known materials may be used as the axial molecule of the polyrotaxane. For example, the chain part may be linear or branched as long as the axial molecule can pass through the inside of each of the rings of the cyclic molecules and is generally formed from a polymer.

Examples of the polymer forming the chain part of the axial molecule include polyvinyl alcohol, polyvinyl pyrrolidone, cellulose-based resins (such as carboxymethyl cellulose, hydroxyethyl cellulose and hydroxypropyl cellulose), polyacrylamide, polyethylene oxide, polyethylene glycol, polypropylene glycol, polyvinyl acetal, polyvinyl methyl ether, polyamine, polyethyleneimine, casein, gelatin, starch, olefin-based resins (such as polyethylene and polypropylene), polyester, polyvinyl chloride, styrene-based resins (such as polystyrene and acrylonitrile-styrene copolymer resin), acrylic resins (such as poly(meth)acrylic acid, polymethyl methacrylate, polymethyl acrylate and acrylonitrile-methyl acrylate copolymer resin), polycarbonate, polyurethane, vinyl chloride-vinyl acetate copolymer resin, polyvinyl butyral, polyisobutylene, polytetrahydrofuran, polyaniline, acrylonitrile-butadiene-styrene copolymer (ABS resin), polyamides (such as nylon), polyimide, polydienes (such as polyisoprene and polybutadiene), polysiloxanes (such as polydimethylsiloxane), polysulfone, polyimine, polyacetic anhydride, polyurea, polysulfide, polyphosphazene, polyketone polyphenylene and polyhalo olefin. These polymers may be copolymerized or modified.

In the photochromic polyrotaxane compound used in the present invention, the polymer forming the chain part is preferably polyethylene glycol, polyisoprene, polyisobutylene, polybutadiene, polypropylene glycol, polytetrahydrofuran, polydimethylsiloxane, polyethylene, polypropylene, polyvinyl alcohol or polyvinyl methyl ether, most preferably polyethylene glycol.

Further, the bulky group formed at the both ends of the chain part is not particularly limited if it prevents the desorption of the cyclic molecules from the axial molecule. From the viewpoint of bulkiness, adamantyl group, trityl group, fluoresceinyl group, dinitrophenyl group and pyrenyl group are used. Out of these, adamantyl group is preferred from the viewpoint of introduction ease.

Although the molecular weight of the above-described axial molecule is not particularly limited, when it is too high, compatibility with another component, for example, a polymerizable compound other than the photochromic polyrotaxane compound, which is suitably blended, tends to lower and when it is too low, the mobility of the cyclic molecules becomes low, whereby photochromic properties tend to deteriorate. From this point of view, the weight average molecular weight Mw of the axial molecule is preferably 1,000 to 100,000, more preferably 3,000 to 80,000, particularly preferably 5,000 to 30,000.

To improve compatibility with another polymerizable compound and suppress a rise in viscosity, the compound forming the axial molecule may be a low-molecular weight material. Stated more specifically, the weight average molecular weight of the axial molecule is preferably 200 to 50,000, more preferably 1,000 to 20,000. This weight average molecular weight Mw is a value measured by GPC described in Examples which will be given hereinafter.

Each of the cyclic molecules should have a ring large enough to clathrate the above axial molecule. Examples of this ring include cyclodextrin ring, crown ether ring, benzo-crown ring, dibenzo-crown ring and dicyclohexano-crown ring. Out of these, cyclodextrin ring is particularly preferred.

The cyclodextrin ring has α-form (ring inner diameter of 0.45 to 0.6 nm), β-form (ring inner diameter of 0.6 to 0.8 nm) or γ-form (ring inner diameter of 0.8 to 0.95 nm). In the present invention, α-cyclodextrin ring and β-cyclodextrin ring are preferred, and α-cyclodextrin ring is most preferred.

A plurality of the cyclic molecules having the above ring clathrate one axial molecule. In general, when the maximum number of cyclic molecules capable of clathrating one axial molecule is 1, the number of clathrating cyclic molecules is preferably 0.001 to 0.6, more preferably 0.002 to 0.5, much more preferably 0.003 to 0.4. When the number of clathrating cyclic molecules is too large, the cyclic molecules are densely existent for one axial molecule, whereby the mobility of the cyclic molecules becomes low and photochromic properties tend to deteriorate. When the number of clathrating cyclic molecules is too small, the space between adjacent axial molecules becomes small and the number of spaces which can allow for the reversible reaction of the photochromic compound molecule becomes small, whereby photochromic properties tend to deteriorate as well.

The maximum number of cyclic molecules clathrating one axial molecule can be calculated from the length of the axial molecule and the thickness of each of the rings of the cyclic molecules.

For example, when the chain part of the axial molecule is formed from polyethylene glycol and the rings of the cyclic molecules are α-cyclodextrin rings, the maximum number of clathrating cyclic molecules is calculated as follows.

That is, the total length of two recurring units [—CH$_2$—CH$_2$O-] of polyethylene glycol approximates the thickness of one α-cyclodextrin ring. Therefore, the number of the recurring units is calculated from the molecular weight of polyethylene glycol to obtain ½ of the number of the recurring units as the maximum number of clathrating cyclic molecules. Based on the condition that the maximum number of clathrating cyclic molecules is 1.0, the number of clathrating cyclic molecules is adjusted to the above range.

In the photochromic polyrotaxane compound used in the present invention, a side chain containing a photochromic moiety is introduced into the above-described cyclic molecule. Further, a side chain containing a polymerizable group is introduced into the above-described cyclic molecule. The side chain is represented by "5" in FIG. 1.

In the present invention, the photochromic moiety and the polymerizable group are introduced into the side chains. FIG. 2 shows an example of the preferred photochromic polyrotaxane compound "1a" in the present invention. The axial molecule "2", the cyclic molecule "3" and the bulky terminal group "4" are the same as in FIG. 1. The photochromic moiety "6" and the polymerizable group (not shown) are introduced into the side chains "5" in FIG. 2.

In FIG. 2, the photochromic moiety "6" is introduced into a first side chain "5a" which is a type of the side chain "5". As will be described in detail hereinunder, in the photochromic polyrotaxane compound "1a" of the present invention, it is preferred from the viewpoint of productivity that the first side chain "5a" should be introduced in the cyclic molecule "3" and further extended to become the side chain "5". The photochromic moiety "6" may be introduced into not only the first side chain "5a" but also the side chain "5". When the productivity of the photochromic polyrotaxane compound of the present invention is taken into consideration, the photochromic moiety "6" is preferably introduced into the first side chain "5a". The polymerizable group may be introduced into the first side chain "5a" and the side chain "5".

That is, by introducing the side chain "5" (and/or the first side chain "5a") into the ring, an appropriate space can be surely formed between adjacent axial molecules, thereby making it possible to secure a space which can allow for the reversible reaction of the photochromic compound molecule and to develop excellent photochromic properties. This side chain "5" forms a pseudo-crosslinked structure in the polyrotaxane, thereby making it possible to improve the mechanical strength of a photochromic cured body formed by using the photochromic polyrotaxane composition of the present invention.

Although the above side chain is not particularly limited, the average molecular weight of this side chain is preferably 45 to 10,000, more preferably 100 to 8,000, much more preferably 200 to 5,000, particularly preferably 300 to 2,000.

The average molecular weight of this side chain can be adjusted by the amount of a compound used at the time of introducing the side chain. The average molecular weight of the above side chain does not include the molecular weight of the photochromic moiety or the molecular weight of the polymerizable group.

When the side chain is too small, its function of securing the space which can allow for the reversible reaction of the photochromic moiety becomes unsatisfactory and when the side chain is too large, it is difficult to arrange the photochromic moiety which will be described hereinafter in the vicinity of the polyrotaxane with the result that it may be difficult to fully utilize the space secured by the polyrotaxane.

Further, the above side chain is introduced by using the functional groups of the ring of the cyclic molecule and modifying them. For example, the α-cyclodextrin ring has 18 hydroxyl groups as the functional groups through which the side chains are introduced. That is, a maximum of 18 side chains can be introduced into one α-cyclodextrin ring. In the present invention, to fulfill the function of the above-described side chain, not less than 6%, particularly not less than 30% of all the functional groups of the ring are preferably modified by the side chain. When the side chain is bonded to 9 out of the 18 hydroxyl groups of the above α-cyclodextrin ring, the degree of modification is 50%. As a matter of course, the other hydroxyl groups remain as they are.

In the present invention, the above side chain (organic chain) may be linear or branched as long as its size falls within the above range. A side chain having an appropriate size can be introduced by reacting a suitable compound with the functional groups of the cyclic molecule by using ring-opening polymerization, radical polymerization, cationic polymerization, anionic polymerization or living radical polymerization such as atom transfer radical polymerization, RAFT polymerization or NMP polymerization. The side chain formed by this polymerization can be extended by using various known reactions on the terminal of the side chain, and the photochromic moiety and the polymerizable group which will be described in detail hereinafter can be introduced. The photochromic moiety or the polymerizable group may be bonded directly to the side chain. The side chain formed by polymerization or the side chain extended by using various reactions preferably has an average molecular weight of 300 to 2,000 excluding the photochromic moiety and the polymerizable group as described above.

For example, a side chain derived from a cyclic compound such as cyclic ether, cyclic siloxane, lactone compound, cyclic acetal, cyclic amine, cyclic carbonate, cyclic iminoether or cyclic thiocarbonate can be introduced by ring-opening polymerization. From the viewpoints of acquisition ease, high reactivity and easy control of size (molecular weight), cyclic ether, cyclic siloxane, lactone compound and cyclic carbonate are preferably used. Preferred examples of the cyclic compound are given below.

Cyclic ether; ethylene oxide, 1,2-propylene oxide, epichlorohydrin, epibromohydrin, 1,2-butylene oxide, 2,3-butylene oxide, isobutylene oxide, oxetane, 3-methyloxetane, 3,3-dimethyloxetane, tetrahydrofuran, 2-methyl tetrahydrofuran and 3-methyl tetrahydrofuran Cyclic siloxane; hexamethyl cyclotrisiloxane and octamethyl cyclotetrasiloxane Lactone compound;

4-membered lactones such as β-propiolactone, β-methyl propiolactone and L-serine-β-lactone 5-membered lactones such as γ-butyrolactone, γ-hexanolactone, γ-heptanolactone, γ-octanolactone, γ-decanolactone, γ-dodecanolactone, α-hexyl-γ-butyrolactone, α-heptyl-γ-butyrolactone, α-hydroxy-γ-butyrolactone, γ-methyl-γ-decanolactone, α-methylene-γ-butyrolactone, α,α-dimethyl-γ-butyrolactone, D-erythronolactone, α-methyl-γ-butyrolactone, γ-nonanolactone, DL-pantolactone, γ-phenyl-γ-butyrolactone, γ-undecanolactone, γ-valerolactone, 2,2-pentamethylene-1,3-dioxolan-4-one, α-bromo-γ-butyrolactone, γ-crotonolactone, α-methylene-γ-butyrolactone, α-methacryloyloxy-γ-butyrolactone and β-methacryloyloxy-γ-butyrolactone 6-membered lactones such as δ-valerolactone, δ-hexanolactone, δ-octanolactone, δ-nonanolactone, δ-decanolactone, δ-undecanolactone, δ-dodecanolactone, δ-tridecanolactone, δ-tetradecanolactone, DL-mevalonolactone, 4-hydroxy-1-cyclohexane carboxylic acid δ-lactone, monomethyl-δ-valerolactone, monoethyl-δ-valerolactone, monohexyl-δ-valerolactone, 1,4-dioxan-2-one and 1,5-dioxepan-2-one 7-membered lactones such as ε-caprolactone, monomethyl-ε-caprolactone, monoethyl-ε-caprolactone, monohexyl-ε-caprolactone, dimethyl-ε-caprolactone, di-n-propyl-ε-caprolactone, di-n-hexyl-ε-caprolactone, trimethyl-ε-caprolactone, triethyl-ε-caprolactone, tri-n-ε-caprolactone, ε-caprolactone, 5-nonyl-oxepan-2-one, 4,4,6-trimethyl-oxepan-2-one, 4,6,6-trimethyl-oxepan-2-one and 5-hydroxymethyl-oxepan-2-one 8-membered lactones such as ξ-enantholactone other lactones such as lactone, lactide, dilactide, tetramethyl glycoside, 1,5-dioxepan-2-one and t-butyl caprolactone Cyclic carbonate; ethylene carbonate, propylene carbonate, 1,2-butylene carbonate, glycerol 1,2-carbonate, 4-(methoxymethyl)-1,3-dioxolan-2-one, (chloromethyl)ethylene carbonate, vinylene carbonate, 4,5-dimethyl-1,3-dioxol-2-one, 4-chloromethyl-5-methyl-1,3-dioxol-2-one, 4-vinyl-1,3-dioxolan-2-one, 4,5-diphenyl-1,3-dioxolan-2-one, 4,4-dimethyl-5-methylene-1,3-dioxolan-2-one, 1,3-dioxan-2-one, 5-methyl-5-propyl-1,3-dioxolan-2-one and 5,5-diethyl-1,3-dioxolan-2-one The above cyclic compounds may be used alone or in combination of two or more.

In the present invention, lactone compounds and cyclic carbonates are preferred, lactone compounds such as ε-caprolactone, α-acetyl-γ-butyrolactone, α-methyl-γ-butyrolactone, γ-valerolactone and γ-butyrolactone are particularly preferred, and ε-caprolactone is most preferred.

When the side chain is to be introduced by reacting the cyclic compound through ring-opening polymerization, a functional group (for example, hydroxyl group) bonded to the cyclic compound has poor reactivity, whereby it may be difficult to directly react a large molecule due to steric hindrance. In this case, for example, there can be employed means for introducing a side chain through ring-opening polymerization using the above-described cyclic compound after hydroxypropylation is carried out by reacting a low-molecular weight compound such as propylene oxide with a functional group to react, for example, caprolactone so as to introduce a highly reactive functional group (hydroxyl group). The side chain formed by the ring-opening polymerization of the low-molecular weight compound such as propylene oxide and the cyclic compound may be referred to as "first side chain" hereinafter (as described above, "5a" in FIG. 2 represents this first side chain.)

The polyrotaxane compound which is most preferably used in the present invention comprises an axial molecule formed from polyethylene glycol bonded to an adamantyl group at both ends and cyclic molecules having an α-cyclodextrin ring.

(A) photochromic polyrotaxane compound; a photochromic polyrotaxane compound in which a side chain containing a photochromic moiety is bonded to a cyclic molecule.

In the polyrotaxane compound used in the present invention, a side chain containing a photochromic moiety is bonded to a cyclic molecule. Since the photochromic moiety can be always arranged in the vicinity of the polyrotaxane compound thereby, even when a polymerizable compound other than the photochromic polyrotaxane compound is used in combination with the photochromic polyrotaxane compound, the fading speed can be increased while high color optical density is retained.

The photochromic moiety can be bonded to the cyclic molecule by using the above-described side chain or combining a linking group L as required. That is, the above photochromic moiety having the first side chain and the linking group L is reacted with the cyclic molecule to bond the first side chain to the linking group L, thereby making it possible to introduce the chain containing the photochromic moiety into the above cyclic molecule. In this case, the "chain" contains a moiety obtained by reacting "the first side chain and the linking group L" and the moieties of the first side chain and the linking group L. As described above, the "chain" corresponds to the above side chain. However, as described above, the photochromic moiety may be directly bonded to the first side chain. In this case, the first side chain can be regarded as the "chain" and the "chain" becomes the side chain (the first side chain becomes the side chain).

The average molecular weight of the "chain" excluding the photochromic moiety is preferably 45 to 10,000, more preferably 100 to 8,000, much more preferably 200 to 5,000, particularly preferably 300 to 2,000.

Known photochromic materials may be used as the photochromic moiety and may be used alone or in combination of two or more.

Typical examples of the photochromic moiety include naphthopyran, spirooxazine, spiropyran, fulgide, fulgimide and diarylethene.

Out of these, indenonaphthopyrans are preferred, out of which indeno[2,1-f]naphtho[1,2-b]pyran is particularly preferred as it exhibits excellent photochromic properties, especially color optical density and fading speed.

Indeno[2,1-f]naphtho[1,2-b]pyran which is particularly preferred as the photochromic moiety is represented by the following formula (4):

[CF 5]

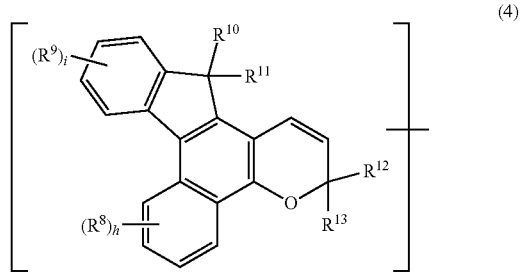

wherein $R^8$ and $R^9$ are each independently a group directly bonded to L which will be described hereinafter, hydroxyl group, alkyl group, haloalkyl group, cycloalkyl group which may have a substituent, alkoxy group, amino group (group including primary or secondary amine), heterocyclic group having a ring member nitrogen atom and bonded to a carbon atom by the nitrogen atom bonded thereto (which may have a substituent), cyano group, nitro group, formyl group, hydroxycarbonyl group, alkylcarbonyl group, alkoxycarbonyl group, halogen atom, aralkyl group which may have a substituent, aralkoxy group which may have a substituent, aryloxy group which may have a substituent, aryl group which may have a substituent, alkylthio group, cycloalkylthio group and arylthio group which may have a substituent, and two adjacent $R^8$'s and two adjacent $R^9$'s may independently form an aliphatic ring (which may have a substituent) which may contain an oxygen atom, nitrogen atom or sulfur atom; $R^{10}$ and $R^{11}$ are each independently a group directly bonded to L which will be described hereinafter, hydrogen atom, hydroxyl group, alkyl group, haloalkyl group, cycloalkyl group, alkoxy group, alkoxyalkyl group, formyl group, hydroxycarbonyl group, alkylcarbonyl group, alkoxycarbonyl group, halogen atom, aralkyl group which may have a substituent, aralkoxy group which may have a substituent, aryloxy group which may have a substituent or aryl group which may have a substituent, and $R^{10}$ and $R^{11}$ may form together an aliphatic ring having 3 to 20 ring member carbon atoms, condensed polycyclic ring obtained by condensing an aromatic ring or aromatic hetero-ring to the aliphatic ring, heterocyclic ring having 3 to 20 ring member atoms, or condensed polycyclic ring obtained by condensing an aromatic ring or aromatic hetero ring to the hetero ring together with the carbon atom at the 13-position bonded thereto, with the proviso that these rings may have a substituent; $R^{12}$ and $R^{13}$ are each independently an aryl group which may have a substituent or heteroaryl group which may have a substituent; and "h" is an integer of 0 to 4, "i" is an integer of 0 to 4, when "h" is 2 to 4, a plurality of $R^{8'}$ s may be the same or different and when "i" is 2 to 4, a plurality of $R^9$'s may be the same or different, with the proviso that at least one substituent on the aryl group or heteroaryl group represented by $R^8$, $R^9$, $R^{10}$, $R^{11}$ and $R^{12}$ or at least one substituent on the aryl group or heteroaryl group represented by $R^{13}$ is a substituent L which will be described hereinafter.

The groups represented by $R^8$, $R^9$, $R^{10}$, $R^{11}$, $R^{12}$ and $R^{13}$, or the substituents which may be possessed by the ring groups formed by these groups are introduced to control mainly developed color tone and do not impair the effect of the present invention. Therefore, although they are not particularly limited, the groups represented by $R^8$ and $R^9$ are preferred.

Preferably, the alkyl group has 1 to 6 carbon atoms, the haloalkyl group has 1 to 6 carbon atoms, the cycloalkyl group has 3 to 8 carbon atoms, the alkoxy group has 1 to 6 carbon atoms, the alkylcarbonyl group has 2 to 7 carbon atoms, the alkoxycarbonyl group has 2 to 7 carbon atoms, the aralkyl group has 7 to 11 carbon atoms, the aralkoxy group has 7 to 11 carbon atoms, the aryloxy group has 6 to 12 carbon atoms, the aryl group has 6 to 12 carbon atoms, the alkylthio group has 1 to 6 carbon atoms, the cycloalkylthio group has 3 to 8 carbon atoms, and the arylthio group has 6 to 12 carbon atoms.

As indeno[2,1-f]naphtho[1,2-b]pyran forming the photochromic moiety, compounds described in pamphlets of International Publications Nos. WO1996/014596, WO2001/019813, WO2001/060811, WO2005/028465, WO2006/110221, WO2007/073462, WO2007/140071, WO2008/054942, WO2010/065393, WO2011/10744, WO2011/016582, WO2011/025056, WO2011/034202, WO2011/078030, WO2012/102409, WO2012/102410 and WO2012/121414 may be used without restriction.

Then, the above side chain containing the photochromic moiety is represented by the following formula (1);

[CF 6]

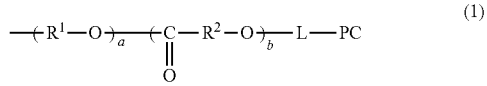

(1)

wherein PC is a photochromic group, $R^1$ is a linear or branched alkylene group having 2 to 8 carbon atoms, $R^2$ is a linear or branched alkylene group having 2 to 8 carbon atoms, linear or branched alkylene group having an acetyl group branch and 3 to 8 carbon atoms, or linear or branched alkylene group having an ether bond and 3 to 8 carbon atoms, L is divalent group represented by the following formula (2):

[CF 7]

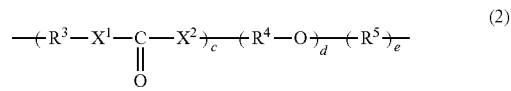

(2)

wherein $R^3$ is a single bond, linear or branched alkylene group having 1 to 20 carbon atoms, cycloalkyl group having 3 to 12 carbon atoms or aromatic group having 6 to 12 carbon atoms, $R^4$ is a linear or branched alkylene group having 1 to 20 carbon atoms, cycloalkyl group having 3 to 12 carbon atoms, aromatic group having 6 to 12 carbon atoms, or dialkylsilyl group having a linear or branched chain alkyl group with 1 to 20 carbon atoms, $R^5$ is a linear or branched alkylene group having 1 to 20 carbon atoms, cycloalkyl group having 3 to 12 carbon atoms or aromatic group having 6 to 12 carbon atoms, $X^1$ and $X^2$ are each independently a single bond, 0 or NH, "c" is an integer of 0 to 50, "d" is an integer of 0 to 50, "e" is an integer of 0 or 1, when "c" is 2 or more, a "c" number of divalent groups may be the same or different, and when "d" is 2 or more, a "d" number of divalent groups may be the same or different, "a" is an integer of 1 to 50 and "b" is an integer of 0 to 50, when "a" is 2 or more, an "a" number of divalent groups may be the same or different, and when "b" is 2 or more, a "b" number of divalent groups may be the same or different.

As for particularly preferred groups, $R^1$ is preferably an ethyl group, propyl group, isopropyl group or butyl group, particularly preferably isopropyl group. "a" is preferably 1 to 10, particularly preferably 1.

$R^2$ is particularly preferably a butylene group, pentylene group or hexylene group. "b" is preferably 1 to 10, particularly preferably 2 to 8.

In L represented by the above formula (2), $R^3$ is preferably a single bond (in this case, $X^1$ is directly bonded to the oxygen atom of the unit "b"), ethylene group, propylene group or cyclohexylene group. It is particularly preferably a single bond or ethylene group.

Preferably, $X^1$ and $X^2$ are each a single bond (in this case, a carbonyl group is directly bonded to $R^3$ and $R^4$) or 0.

$R^4$ is preferably an ethylene group, propylene group, butylene group or dimethylsilyl group, particularly preferably an ethylene group or dimethylsilyl group.

"c" is preferably 2, "d" is preferably 1 to 10, particularly preferably 1 to 5, and "e" is preferably 0.

Particularly preferred examples of L are given below.

[CF 8]

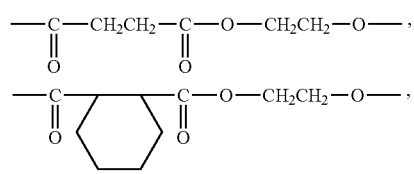

-continued

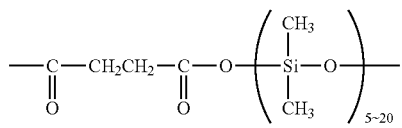

As a matter of course, the side chain from which PC is removed from the above formula (1) corresponds to the "chain", and the average molecular weight of the "chain" excluding PC is preferably 45 to 10,000, more preferably 100 to 8,000, much more preferably 200 to 5,000, particularly preferably 300 to 2,000.

(Photochromic Polyrotaxane Compound in which a Chain Containing a Polymerizable Group is Bonded to a Cyclic Molecule)

In the photochromic polyrotaxane compound of the present invention, a chain containing a polymerizable group may be further bonded to a cyclic molecule. Thereby, a cured body having excellent photochromic properties can be obtained by polymerizing and curing the photochromic polyrotaxane compound alone or a combination of the photochromic polyrotaxane compound and a polymerizable compound other than the photochromic polyrotaxane compound, which will be described hereinafter.

The chain containing a polymerizable group can be bonded to a cyclic molecule by using the above-described side chain (first side chain) like the above chain containing a photochromic moiety and combining the linking group L as required. The terminal of the first side chain may be a polymerizable group. In this case, the first side chain corresponds to the chain containing a polymerizable group. When the polymerizable group is introduced into the cyclic molecule by reacting the first side chain and polymerizable group-containing compound having a linking group L to bond the first side chain and the linking group L, the "chain" contains a moiety obtained by reacting "the first side chain and the linking group L" and the moieties of the first side chain and the linking group L. As described above, the "chain" corresponds to the above side chain. The average molecular weight of the "chain" excluding the polymerizable group is preferably 45 to 10,000, more preferably 100 to 8,000, much more preferably 200 to 5,000, particularly preferably 300 to 2,000.

That is, the chain containing a polymerizable group represented by the following formula (3) is introduced into a cyclic molecule.

[CF 9]

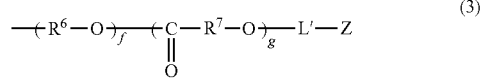

In the above formula, Z is a polymerizable group, $R^6$ is a linear or branched alkylene group having 2 to 8 carbon atoms, $R^7$ is a linear or branched alkylene group having 2 to 8 carbon atoms, linear or branched alkylene group having an acetyl group branch and 3 to 8 carbon atoms, or linear or branched alkylene group having an ether bond and 3 to 8 carbon atoms, L' is divalent group represented by the following formula (2'):

[CF 10]

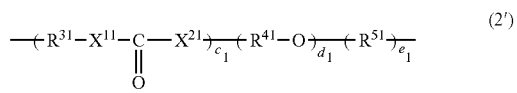

wherein $R^{31}$ is a single bond, linear or branched alkylene group having 1 to 20 carbon atoms, cycloalkyl group having 3 to 12 carbon atoms, or aromatic group having 6 to 12 carbon atoms, $R^{41}$ is a linear or branched alkylene group having 1 to 20 carbon atoms, cycloalkyl group having 3 to 12 carbon atoms, aromatic group having 6 to 12 carbon atoms, or dialkylsilyl group having a linear or branched chain alkyl group with 1 to 20 carbon atoms, and $R^{51}$ is a linear or branched alkylene group having 1 to 20 carbon atoms, cycloalkyl group having 3 to 12 carbon atoms, or aromatic group having 6 to 12 carbon atoms, $X^{11}$ and $X^{21}$ are each independently a single bond, 0 or NH, "$c_1$" is an integer of 0 to 50, "$d_1$" is an integer of 0 to 50, "$e_1$" is an integer of 0 or 1, when "$c_1$" is 2 or more, a "$c_1$" number of divalent groups may be the same or different, and when "$d_1$" is 2 or more, a "$d_1$" number of divalent groups may be the same or different, "f" is an integer of 1 to 50 and "g" is an integer of 0 to 50, when "f" is 2 or more, an "f" number of divalent groups may be the same or different, and when "g" is 2 or more, a "g" number of divalent groups may be the same or different.

As a matter of course, the chain from which Z is removed from the above formula (3) corresponds to the "chain" and the average molecular weight of the "chain" excluding Z is preferably 45 to 10,000, more preferably 100 to 8,000, much more preferably 200 to 5,000, particularly preferably 300 to 2,000.

Typical examples of the polymerizable group include radically polymerizable groups such as acrylic group, methacrylic group, allyl group, vinyl group and 4-vinylphenyl group. However, epoxy group, episulfide group, thietanyl group, OH group, SH group, $NH_2$ group, NCO group and NCS group which function as a polymerizable group may be used according to the type of the polymerizable compound other than the photochromic polyrotaxane compound.

As for particularly preferred groups, $R^6$ is preferably an ethyl group, propyl group, isopropyl group or butyl group, particularly preferably isopropyl group. "f" is preferably 1 to 10, particularly preferably 1.

$R^7$ is particularly preferably a butylene group, pentylene group or hexylene group. "g" is preferably 1 to 10, particularly preferably 2 to 8.

In L' represented by the above formula (2'), $R^{31}$ is preferably a single bond, ethylene group, propylene group or cyclohexylene group, particularly preferably a single bond or ethylene group.

$X^{11}$ is preferably a single bond or O.

$X^{21}$ is preferably a single bond, 0 or NH.

$R^{41}$ is preferably an ethylene group, propylene group, butylene group or dimethylsilyl group, particularly preferably an ethylene group or dimethylsilyl group.

$R^{51}$ is preferably a methylene group, ethylene group or propylene group.

"$c_1$" is preferably 2, "$d_1$" is preferably 1 to 10, particularly preferably 1 to 5, and "$e_1$" is preferably 0.

Particularly preferred examples of L' are given below.

[CF 11]

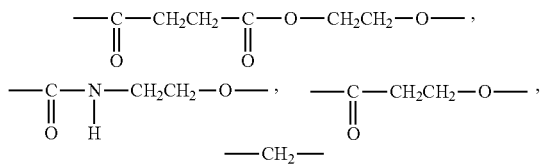

In the above formulas, the epoxy group, episulfide group and thietanyl group react with the epoxy group, episulfide group, thietanyl group, $NH_2$ group or NCO group of the polymerizable compound other than the photochromic polyrotaxane compound of the present invention.

The OH group and SH group react with the NCO group or NCS group of the polymerizable compound other than the photochromic polyrotaxane compound of the present invention to produce a urethane bond and thiourethane bond, respectively.

The NCO group and NCS group react with the OH group, SH group or $NH_2$ group of the polymerizable compound other than the photochromic polyrotaxane compound of the present invention.

(Preferred Number of Side Chains Having a Photochromic Moiety and Preferred Number of Side Chains Having a Polymerizable Group)

The number of side chains containing a photochromic moiety which can be introduced into one molecule of the polyrotaxane compound is not particularly limited and may be 1 to 5,000 per molecule. When the number is too small, color optical density becomes unsatisfactory and when it is too large, color optical density becomes saturated, whereby the photochromic moiety cannot be made function effectively. Therefore, the number is preferably 3 to 1,000. The number of the side chains is an average value.

The number of side chains containing a polymerizable group is also not particularly limited and may be 0 to 5,000. However, when it is too small, it is difficult to polymerize the polyrotaxane compound by itself and even when a polymerizable compound other than the photochromic polyrotaxane compound is blended, the compound may not bond in the cured body and may bleed out. Therefore, the number is preferably 10 to 5,000. The number of the chains is an average value.

When the cyclic molecule is a cyclodextrin ring, a photochromic polyrotaxane compound in which 1 to 100%, preferably 5 to 80%, more preferably 10 to 60% of the side chains bonded to the cyclodextrin ring are the above side chains having the photochromic moiety and 0 to 99%, preferably 20 to 95%, more preferably 40 to 90% of the side chains are the above side chains having the polymerizable group is particularly preferred as it provides excellent photochromic properties. As described above, the side chain (including the first side chain) is not introduced into all of the functional groups of the cyclic molecule.

The photochromic moiety and the polymerizable group may not be introduced into all of the side chains (including the first side chains). For example, when the polymerizable group of the polymerizable compound is a radically polymerizable group and productivity, photochromic properties and polymerizability with another polymerizable compound are taken into consideration, the photochromic polyrotaxane compound to be combined with the polymerizable compound is preferably such that side chains having the above photochromic moiety account for 5 to 50%, side chains having a radically polymerizable group account for 10 to 90% and side chains having no photochromic moiety and no polymerizable group (side chains having a hydroxyl group or another group at the terminal) account for 5 to 50% of the side chains bonded to the cyclodextrin ring and more preferably such that side chains having the above photochromic moiety account for 10 to 40%, side chains having the above polymerizable group account for 20 to 80% and side chains having no photochromic moiety and no polymerizable group account for 10 to 40% of the side chains bonded to the cyclodextrin ring.

Although the photochromic polyrotaxane compound of the present invention is not particularly limited, it has a weight average molecular weight Mw of preferably 6,000 to 200,000, more preferably 8,000 to 150,000. To improve compatibility with another polymerizable compound and obtain an excellent effect by introducing a large number of photochromic moieties without increasing monomer viscosity excessively before curing, the weight average molecular weight Mw of the photochromic polyrotaxane compound is much more preferably 10,000 to 120,000, particularly preferably 7,000 to 100,000.

(Production Method of Photochromic Polyrotaxane Compound)

Although the method of producing the photochromic polyrotaxane compound of the present invention is not limited, the photochromic polyrotaxane compound can be produced by the following method.

The polyrotaxane skeleton is first produced by a known method. Then, the first side chain is introduced into the cyclic molecules of the polyrotaxane skeleton by a known method. At this point, the terminal of the first side chain is preferably a reactive group (for example, OH group).

Separately, at least a group having a photochromic moiety and capable of reacting with the first side chain is introduced into the photochromic moiety. Preferably, this group is a group forming the above L.

The photochromic polyrotaxane compound of the present invention can be produced by reacting a polyrotaxane having the first side chain with the group capable of forming the above L. The photochromic moiety and the above first side chain may be directly reacted with each other (in this case, L is a single bond).

The reaction between the group capable of forming the above L and the terminal of the first side chain is not particularly limited.

For example, when the terminal of the first side chain is an OH group, the above L can be formed by carrying out an esterification reaction with a compound having carboxylic acid at the terminal. Stated more specifically, the reaction can be carried out in a solvent such as toluene in the presence of a mineral acid such as sulfuric acid or hydrochloric acid, organic acid such as aromatic sulfonic acid, or Lewis acid such as fluorinated boron ether by stirring under heating as required and removing the produced water by azeotrope. As a method of removing water in the above esterification reaction, water is removed with a desiccant such as anhydrous magnesium sulfate or molecular sieves, or water is removed in the presence of a dehydrating agent typified by dicyclohexyl carbodiimide.

The above L can also be formed by carrying out an esterification reaction with a compound having carboxylic acid halide at the terminal. Stated more specifically, a method in which the produced hydrogen halide is removed by stirring under heating as required in an ether-based solvent such as tetrahydrofuran in the presence of a base such as pyridine or dimethyl aniline may be employed.

Further, the above L can be formed by carrying out an esterification reaction with a compound having an acid anhydride at the terminal. Sated more specifically, a method in which the above reaction is carried out by stirring under heating as required in a solvent such as toluene in the presence of a catalyst such as sodium acetate or pyridine may be employed.

As an alternative method, the above L can be formed by carrying out a urethanization reaction with a compound having an NCO group at the terminal. Stated more specifically, a method in which the above reaction is carried out by stirring under heating as required without a solvent or in a solvent such as toluene in the presence of an amine-based catalyst such as triethylenediamine or tin-based catalyst such as dibutyltin dilaurate may be employed.

To introduce the chain having a polymerizable group, the same method as the above method may be employed. A compound prepared by substituting the photochromic moiety by the polymerizable group should be reacted with the group capable of forming the above L'. When the reactive group at the terminal of the first side chain is the polymerizable group in the present invention, the polymerizable group may be used as it is.

(Polymerizable Compound Other than Photochromic Polyrotaxane Compound)

The photochromic composition of the present invention may comprise a polymerizable compound other than the above photochromic polyrotaxane compound as required. Examples of the polymerizable compound (may be referred to as "component (B)") include a radically polymerizable compound (B1), epoxy-based polymerizable compound (B2), urethane- or urea-based polymerizable compound capable of forming a urethane bond or urea bond (B3) and polymerizable compound (B4) other than the above compounds (B1 to B3). Especially when a polymerizable group has been introduced into the photochromic polyrotaxane compound, a polymerizable compound able to react with this polymerizable group is preferably used.

(B1) Radically Polymerizable Compound;

The radically polymerizable compound (B1) is preferably used when a radically polymerizable functional group has been introduced into the side chains of the photochromic polyrotaxane compound. Radically polymerizable compounds are roughly divided into (meth)acrylic polymerizable compounds having a (meth)acrylic group (B1-1), vinyl-based polymerizable compounds having a vinyl group (B1-2), allyl-based polymerizable compounds having an allyl group (B1-3) and silsesquioxane-based polymerizable compounds (B1-4).

Examples of the compounds are given below.

(B1) Examples of (Meth)Acrylicpolymerizable Compound;

(B1-1-1) Bifunctional (Meth)Acrylic Polymerizable Compound

The photochromic curable composition of the present invention preferably comprises a bifunctional (meth)acrylic polymerizable compound (B1-1-1). Examples of the compound are given below. More specifically, they are compounds represented by the following formulas (5), (6) and (7). A compound represented by the following formula (5) may be simply referred to as component (B1-1-1-1), a compound represented by the following formula (6) may be simply referred to as component (B1-1-1-2) and a compound represented by the following formula (7) may be simply referred to as component (B1-1-1-3). A bifunctional (meth) acrylic polymerizable compound having a urethane bond (may be simply referred to as "component (B1-1-1-4) hereinafter) and a bifunctional (meth)acrylic polymerizable compound (may be simply referred to as component (B1-1-1-5) hereinafter) which does not correspond to the above component (B1-1-1-1), the above component (B1-1-1-2), the above component (B1-1-1-3) and the above component (B1-1-1-4) will also be described hereinafter.

(B1-1-1-1) Compound Represented by the Following Formula (5)

[CF 12]

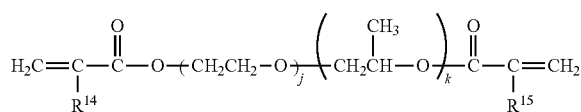

(5)

In the above formula, $R^{14}$ and $R^{15}$ are each a hydrogen atom or methyl group, "j" and "k" are each independently an integer of 0 or more, and (j+k) is an average value of 2 or more to 50 or less.

The polymerizable compound represented by the above formula (5) is obtained in the form of a mixture of molecules having different molecular weights. Therefore, "j" and "k" are average values.

Examples of the compound represented by the above formula (5) are given below.

Diethylene glycol dimethacrylate, triethylene glycol dimethacrylate, tetraethylene glycol dimethacrylate, pentaethylene glycol dimethacrylate, pentapropylene glycol dimethacrylate, diethylene glycol diacrylate, triethylene glycol diacrylate, tetraethylene glycol diacrylate, pentaethylene glycol diacrylate, tripropylene glycol diacrylate, tetrapropylene glycol diacrylate, pentapropylene glycol diacrylate, dimethacrylate composed of a mixture of polypropylene glycol and polyethylene glycol (polyethylene has two recurring units and polypropylene has two recurring units), polyethylene glycol dimethacrylate (especially average molecular weight of 330), polyethylene glycol dimethacrylate (especially, average molecular weight of 536), polyethylene glycol dimethacrylate (especially average molecular weight of 736), tripropylene glycol dimethacrylate, tetrapropylene glycol dimethacrylate, polypropylene glycol dimethacrylate (especially average molecular weight of 536), polyethylene glycol diacrylate (especially average molecular weight of 258), polyethylene glycol diacrylate (especially average molecular weight of 308), polyethylene glycol diacrylate (especially average molecular weight of 508), polyethylene glycol diacrylate (especially average molecular weight of 708) and polyethylene glycol methacrylate acrylate (especially average molecular weight of 536).

(B1-1-1-2) Compound Represented by the Following Formula (6)

[CF 13]

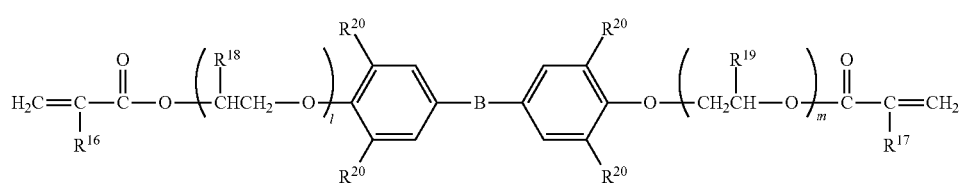

(6)

In the above formula, $R^{16}$ and $R^{17}$ are each a hydrogen atom or methyl group, $R^{18}$ and $R^{19}$ are each a hydrogen atom or methyl group, $R^{20}$ is a hydrogen atom or halogen atom, B is one of —O—, —S—, —(SO$_2$)—, —CO—, —CH$_2$—, —CH=CH—, —C(CH$_3$)$_2$— and —C(CH$_3$)(C$_6$H$_5$)—, "l" and "m" are each an integer of 1 or more, and (l+m) is an average value of 2 or more to 30 or less.

The polymerizable compound represented by the above formula (6) is obtained in the form of a mixture of molecules having different molecular weights. Therefore, "l" and "m" are average values.

Examples of the compound represented by the above formula (6) include the following bisphenol A di(meth) acrylates.

2,2-bis[4-methacryloyloxyethoxy)phenyl]propane (l+m=2), 2,2-bis[4-methacryloyloxydiethoxy)phenyl]propane (l+m=4), 2,2-bis[4-methacryloyloxypolyethoxy)phenyl]propane (l+m=7), 2,2-bis(3,5-dibromo-4-methacryloyloxyethoxyphenyl)propane (l+m=2), 2,2-bis(4-methacryloyloxydipropoxyphenyl)propane (l+m=4), 2,2-bis[4-acryloyloxydiethoxy)phenyl]propane (l+m=4), 2,2-bis[4-acryloyloxypolyethoxy)phenyl]propane (l+m=3), 2,2-bis[4-acryloyloxypolyethoxy)phenyl]propane (l+m=7), 2,2-bis[4-methacryloyloxy(polyethoxy)phenyl]propane (l+m=10), 2,2-bis[4-methacryloyloxy(polyethoxy)phenyl]propane (l+m=17), 2,2-bis[4-methacryloyloxy(polyethoxy)phenyl]propane (l+m=30), 2,2-bis[4-acryloyloxy(polyethoxy)phenyl]propane (l+m=10) and 2,2-bis[4-acryloyloxy(polyethoxy)phenyl]propane (l+m=20).

(B1-1-1-3) Compound Represented by the Following Formula (7)

[CF 14]

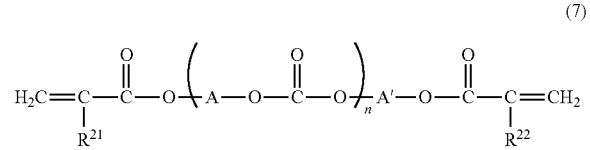

(7)

In the above formula, $R^{21}$ and $R^{22}$ are each a hydrogen atom or methyl group, "n" is an average value of 1 to 20, A and A' may be the same or different and each an linear or branched alkylene group having 2 to 15 carbon atoms, and when a plurality of A's are existent, A's may be the same or different.

The compound represented by the above formula (7) can be produced by reacting a polycarbonate diol with (meth) acrylic acid.

The following compounds may be used as the polycarbonate diol which can be used herein. Examples of the polycarbonate diol include polycarbonate diols (number average molecular weight of 500 to 2,000) obtained by the phosgenation of a polyalkylene glycol such as trimethylene glycol, tetramethylene glycol, pentamethylene glycol, hexamethylene glycol, octamethylene glycol or nonamethylene glycol; polycarbonate diols (number average molecular weight of 500 to 2,000) obtained by the phosgenation of a mixture of two or more polyalkylene glycols, for example, a mixture of trimethylene glycol and tetramethylene glycol, a mixture of tetramethylene glycol and hexamethylene diglycol, a mixture of pentamethylene glycol and hexamethylene glycol, a mixture of tetramethylene glycol and octamethylene glycol or a mixture of hexamethylene glycol and octamethylene glycol; and polycarbonate diols (number average molecular weight of 500 to 2,000) obtained by the phosgenation of 1-methyl trimethylene glycol.

(B1-1-1-4) Bifunctional (Meth)Acrylic Polymerizable Compound Having a Urethane Bond A typical example of the component (B1-1-1-4) is a reaction product of a polyol and a polyisocyanate. Examples of the polyisocyanate include hexamethylene diisocyanate, isophorone diisocyanate, lysine isocyanate, 2,2,4-hexamethylene diisocyanate, dimeric acid diisocyanate, isopropylidenebis-4-cyclohexyl isocyanate, dicyclohexyl methane diisocyanate, norbornene diisocyanate, norbornene methane diisocyanate and methyl cyclohexane diisocyanate.

Meanwhile, examples of the polyol include polyalkylene glycols having the recurring unit of ethylene oxide having 2 to 4 carbon atoms, propylene oxide or hexamethylene oxide, and polyester diols such as polycaprolactone diol. Polycarbonate diols, polybutadiene diols, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol and 1,4-cyclohexane dimethanol are also included.

Urethane (meth)acrylates which are reaction mixtures obtained by urethane prepolymers obtained by reacting the above polyisocyanate and polyol so as to be reacted further with 2-hydroxy (meth)acrylate, and which are reaction mixtures obtained by directly reacting the above diisocyanate with 2-hydroxy (meth)acrylate may also be used.

Examples of the bifunctional (meth)acrylic polymerizable compound having a urethane bond include U-2PPA (molecular weight of 482), UA-122P (molecular weight of 1,100), U-122P (molecular weight of 1,100), U-108A, U-200PA, UA-511, U-412A, UA-4100, UA-4200, UA-4400, UA-2235PE, UA-160TM, UA-6100, UA-6200, U-108, UA-4000 and UA-512 manufactured by Shin-Nakamura Chemical Co., Ltd., EB4858 (molecular weight of 454) manufactured by Daicel-UCB Co., Ltd. and UX-2201, UX3204, UX4101, 6101, 7101 and 8101 manufactured by Nippon Kayaku Co., Ltd.

(B1-1-1-5) Other Bifunctional (Meth)Acrylic Polymerizable Compound Examples of the component (B1-1-1-5) include compounds having a (meth)acrylic group at both ends of an alkylene group which may have a substituent. Compounds having an alkylene group with 6 to 20 carbon atoms are preferred as the component (B1-1-1-5). Examples thereof include 1,6-hexanediol diacrylate, 1,6-hexanediol dimethacrylate, 1,9-nonanediol diacrylate, 1,9-nonanediol dimethacrylate, 1,10-decanediol diacrylate and 1,10-decanediol dimethacrylate.

Other examples of the component (B1-1-1-5) include bifunctional (meth)acrylate monomers containing a sulfur atom. The sulfur atom preferably forms part of a molecular chain as a sulfide group. The bifunctional (meth)acrylate monomers include bis(2-methacryloyloxyethylthioethyl)sulfide, bis(methacryloyloxyethyl)sulfide, bis(acryloyloxyethyl)sulfide, 1,2-bis(methacryloyloxyethylthio)ethane, 1,2-bis(acryloyloxyethyl)ethane, bis(2-methacryloyloxyethylthioethyl)sulfide, bis(2-acryloyloxyethylthioethyl)sulfide, 1,2-bis(methacryloyloxyethylthioethylthio)ethane, 1,2-bis(acryloyloxyethylthioethylthio)ethane, 1,2-bis(methacryloyloxyisopropylthioisopropyl)sulfide and 1,2-bis(acryloyloxyisopropylthioisopropyl)sulfide.

The above compounds listed as examples of the above components (B1-1-1-1), (B1-1-1-2), (B1-1-1-3), (B1-1-1-4) and (B1-1-1-5) may be used alone or in combination. When a plurality of the compounds are used, the amount of the component (B1-1-1) is the total amount of the compounds.

A description is subsequently given of the polyfunctional (meth)acrylic polymerizable compound (B1-1-2)

(B1-1-2) Polyfunctional (Meth)Acrylic Polymerizable Compound

Examples of the component (B1-1-2) include compounds represented by the following formula (8) (may be simply referred to as component (B1-1-2-1) hereinafter), polyfunctional (meth)acrylic polymerizable compounds having a urethane bond (may be simply referred to as component (B1-1-2-2) hereinafter) and polyfunctional (meth)acrylic polymerizable compounds (may be simply referred to as component (B1-1-2-3) hereinafter) which do not correspond to the above component (B1-1-2-1) and the above component (B1-1-2-2).

(B1-1-2-1) Compound Represented by the Following Formula (8)

A compound represented by the following formula (8) is used as the polyfunctional (meth)acrylate polymerizable compound.

[CF 15]

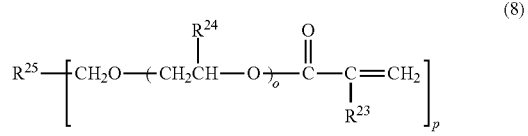

(8)

In the above formula, $R^{23}$ is a hydrogen atom or methyl group, $R^{24}$ is a hydrogen atom or alkyl group having 1 to 2 carbon atoms, $R^{25}$ is a trivalent to hexavalent organic group having 1 to 10 carbon atoms, "o" is an average value of 0 to 3, and "p" is 3 to 6.

The alkyl group having 1 to 2 carbon atoms represented by $R^{24}$ is preferably a methyl group. Examples of the organic group represented by $R^{25}$ include groups derived from a polyol, trivalent to hexavalent hydrocarbon groups and trivalent to hexavalent organic groups containing a urethane bond.

Examples of the compound represented by the above formula (8) include trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate and ditrimethylolpropane tetraacrylate.

(B1-1-2-2) Polyfunctional (Meth)Acrylic Polymerizable Compound Having a Urethane Bond The component (B1-1-2-2) is a compound obtained by reacting a polyisocyanate compound which has been explained in the paragraph for the component (B1-1-1-4) with a polyol compound such as glycerin, trimethylolpropane, pentaerythritol or dipentaerythritol and having three or more (meth)acrylate groups in the molecule. Commercially available products of the compound include U-4HA (molecular weight of 596, 4 functional groups), U-6HA (molecular weight of 1,019, 6 functional groups), U-6LPA (molecular weight of 818, 6 functional groups) and U-15HA (molecular weight of 2,300, 15 functional groups) manufactured by Shin-Nakamura Chemical Co., Ltd.

(B1-1-2-3) Other Polyfunctional (Meth)Acrylic Polymerizable Compound

The component (B1-1-2-3) is a compound obtained by modifying the terminal of a polyester compound with a (meth)acrylic group. Various commercially available polyester (meth)acrylate compounds which differ in the molecular weight of a polyester compound as a raw material and the modification amount of the (meth)acrylic group may be used. Examples of the compound include tetrafunctional polyester oligomers (molecular weight of 2,500 to 3,500, EB80 of Daicel-UCB Co., Ltd., etc.), hexafunctional polyester oligomers (molecular weight of 6,000 to 8,000, EB450 of Daicel-UCB Co., Ltd., etc.), hexafunctional polyester oligomers (molecular weight of 45,000 to 55,000, EB1830 of Daicel-UCB Co., Ltd., etc.), and tetrafunctional polyester oligomers (GX8488B of DKS Co., Ltd. having a molecular weight of 10,000, etc.).

When the component (B1-1-2) ((component (B1-1-2-1), component (B-1-1-2-2) or component (B1-1-2-3)) as exemplified above is used, crosslinking density is improved by polymerization, thereby making it possible to increase the surface hardness of the obtained cured body. Therefore, to obtain a photochromic cured body (laminate) by the coating method, the component (B1-1-2) is preferably contained. Out of the components (B1-1-2), the component (B1-1-2-1) is preferably used.

The above compounds listed as examples of the above components (B1-1-2-1), (B1-1-2-2) and (B1-1-2-3) may be used alone or in combination. When a plurality of the compounds are used, the amount of the component (B1-1-2) is the total amount of the compounds.

A description is subsequently given of the monofunctional (meth)acrylic polymerizable compound (B1-1-3).

(B1-1-3) Monofunctional (Meth)Acrylic Polymerizable Compound

A compound represented by the following formula (9) is used as the component (B1-1-3).

[CF 16]

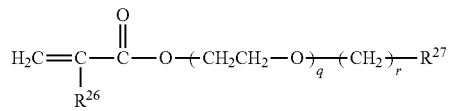

(9)

In the above formula, $R^{26}$ is a hydrogen atom or methyl group, $R^{27}$ is a hydrogen atom, methyl dimethoxysilyl group, trimethoxysilyl group or glycidyl group, "q" is an integer of 0 to 10 and "r" is an integer of 0 to 20.

Examples of the compound represented by the above formula (9) are given below.

Methoxy polyethylene glycol methacrylate (especially average molecular weight of 293), methoxy polyethylene glycol methacrylate (especially average molecular weight of 468), methoxy polyethylene glycol acrylate (especially average molecular weight of 218), methoxy polyethylene glycol acrylate (especially average molecular weight of 454), stearyl methacrylate, lauryl methacrylate, methyl acrylate, ethyl acrylate, butyl acrylate, octyl acrylate, lauryl acrylate, γ-methacryloyloxypropyl trimethoxysilane, γ-methacryloyloxypropylmethyl dimethoxysilane and glycidyl methacrylate.

(B1-2) Vinyl-Based Polymerizable Compound;

Examples of the vinyl-based polymerizable compound having a vinyl group include methyl vinyl ketone, ethyl vinyl ketone, ethyl vinyl ether, styrene, vinyl cyclohexane, butadiene, 1,4-pentadiene, divinyl sulfide, divinyl sulfone, 1,2-divinylbenzene, 1,3-divinyl-1,1,3,3-tetramethylpropane disiloxane, diethylene glycol divinyl ether, divinyl adipate, divinyl sebacate, ethylene glycol divinyl ether, divinyl sulfoxide, divinyl persulfide, dimethyl divinylsilane, 1,2,4-trivinyl cyclohexane, methyl trivinylsilane, α-methylstyrene and α-methylstyrene dimer.

Out of the above vinyl-based polymerizable compounds, α-methylstyrene and α-methylstyrene dimer function as a polymerization regulator and improve the moldability of a photochromic composition.

(B1-3) Allyl-Based Polymerizable Compound

Examples of the allyl-based polymerizable compound having an allyl group are given below. Diethylene glycol bisallyl carbonate, methoxy polyethylene glycol allyl ether (especially average molecular weight of 550), methoxy polyethylene glycol allyl ether (especially average molecular weight of 350), methoxy polyethylene glycol allyl ether (especially average molecular weight of 1,500), polyethylene glycol allyl ether (especially average molecular weight of 450), methoxy polyethylene glycol-polypropylene glycol allyl ether (especially average molecular weight of 750), butoxy polyethylene glycol-polypropylene glycol allyl ether (especially average molecular weight of 1,600), methacryloyloxy polyethylene glycol-polypropylene glycol allyl ether (especially average molecular weight of 560), phenoxy polyethylene glycol allyl ether (especially average molecular weight of 600), methacryloyloxy polyethylene glycol allyl ether (especially average molecular weight of 430), acryloyloxy polyethylene glycol allyl ether (especially average molecular weight of 420), vinyloxy polyethylene glycol allyl ether (especially average molecular weight of 560), styryloxy polyethylene glycol allyl ether (especially average molecular weight of 650) and methoxy polyethylene thioglycol allyl thioether (especially average molecular weight of 730)

Since the allyl-based polymerizable compound serves as a chain transfer agent, the photochromic properties (color optical density, fading speed) of the curable composition can be improved.

(B1-4) Silsesquioxane Polymerizable Compound;

The silsesquioxane polymerizable compound may take a cage-like, ladder-like or random molecular structure and has a radically polymerizable group such as (meth)acrylic group.

Examples of the silsesquioxane polymerizable compound include compounds represented by the following formula (10).

[CF 17]

(10)

In the above formula, "s" is the degree of polymerization which is an integer of 3 to 100, a plurality of $R^{28}$'s may be the same or different and each a radically polymerizable group, organic group containing a radically polymerizable group, hydrogen atom, alkyl group, cycloalkyl group, alkoxy group or phenyl group, and at least one $R^{28}$ is a radically polymerizable group or organic group containing a radically polymerizable group.

Examples of the radically polymerizable group or organic group containing a radically polymerizable group represented by $R^{28}$ include (meth)acrylic group; organic groups having a (meth)acrylic group such as (meth)acryloyloxypropyl group and (3-(meth)acryloyloxypropyl)dimethylsiloxy group; allyl group; organic groups having an allyl group such as allylpropyl group and allylpropyldimethylsiloxy group; vinyl group; and organic groups having a vinyl group such as vinylpropyl group and vinyldimethylsiloxy group.

(B2) Epoxy-Based Polymerizable Compound;

This polymerizable compound has an epoxy group as a polymerizable group in the molecule and is particularly preferred when a hydroxyl group, $NH_2$ group or NCO group is introduced into the side chain of the polyrotaxane (A) as a polymerizable functional group.

The epoxy-based polymerizable compounds are roughly divided into aliphatic epoxy compounds, alicyclic epoxy compounds and aromatic epoxy compounds, and examples thereof are given below.

The aliphatic epoxy compounds include ethylene oxide, 2-ethyloxirane, butyl glycidyl ether, phenyl glycidyl ether, 2,2'-methylene bisoxirane, 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, trimethylolpropane triglycidyl ether, glycerol triglycidyl ether, diglycerol tetraglycidyl ether, pentaerythritol tetraglycidyl ether, diglycidyl ethers of tris(2-hydroxyethyl)isocyanurate and triglycidyl ethers of tris(2-hydroxyethyl)isocyanurate.

The alicyclic epoxy compounds include isophoronediol diglycidyl ether and bis-2,2-hydroxycyclohexylpropane diglycidyl ether.

The aromatic epoxy compounds include resorcin diglycidyl ether, bisphenol A diglycidyl ether, bisphenol F diglycidyl ether, bisphenol S diglycidyl ether, orthophthalic acid diglycidyl ester, phenol novolak polyglycidyl ether and cresol novolak polyglycidyl ether.

Besides the above compounds, epoxy-based polymerizable compounds having a sulfur atom in the molecule in addition to an epoxy group may also be used. This sulfur atom-containing epoxy-based polymerizable compounds contribute especially to the improvement of refractive index and include linear aliphatic and cyclic aliphatic compounds exemplified by the following compounds.

The linear aliphatic sulfur atom-containing epoxy-based polymerizable compounds include bis(2,3-epoxypropyl)sulfide, bis(2,3-epoxypropyl)disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithiaoctane, 1,2,3-tris(2,3-epoxypropylthio)propane, 2,2-bis(2,3-epoxypropylthio)-1,3-bis(2,3-epoxypropylthiomet hyl)propane and 2,2-bis(2,3-epoxypropylthiomethyl)-1-(2,3-epoxypropylthio)b utane.

The cyclic aliphatic sulfur atom-containing epoxy-based polymerizable compounds include 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis(<2-(2,3-epoxypropylthio)ethyl>thiomethyl)-1,4-dithi ane and 2,5-bis(2,3-epoxypropylthiomethyl)-2,5-dimethyl-1,4-dithiane (B3) Urethane-Based Polymerizable Compound (Including Urea-Based Polymerizable Compound)

The polymerization recurring unit of this polymerizable compound is linked by a urethane bond or urea bond, and the compound is effective especially when an epoxy group, episulfide group, thietanyl group, OH group, SH group, $NH_2$ group, NCO group or NCS group is introduced as a polymerizable functional group into the side chain of the photochromic polyrotaxane compound (A).

For example, the urethane bond is formed by a reaction between a polyol and a polyisocyanate and includes a thiourethane bond formed by a reaction between a polyol and a polyisothiocyanate or a reaction between a polythiol and a polyisothioisocyanate.

The urea bond is formed by a reaction between a polyamine and a polyisocyanate and includes a thiourea bond formed by a reaction between a polyamine and a polyisothiocyanate.

As understood from the above explanation, in the present invention, a plurality of compounds are selected from polyols (B3-1), polythiols (B3-2), polyamines (B3-3), polyisocyanates (B3-4) and polyisothiocyanates (B3-5) and used as the urethane- or urea-based polymerizable compounds so as to form the above urethane bond (thiourethane bond) or urea bond (thiourea bond).

When a hydroxyl group, mercapto group (SH group), $NH_2$ group or NCO group is introduced as the polymerizable group into the side chain of the above-described polyrotaxane, the side chain is incorporated into a polymerization chain formed by the urethane- or urea-based polymerizable compound (both may be simply referred to as "urethane-based polymerizable compound" hereinafter) advantageously.

The following compounds are used as a type of the urethane-based polymerizable compound.

(B3-1) Polyol;

The polyol is a compound having at least two OH groups in one molecule, and typical examples thereof include di-, tri-, tetra-, penta- and hexa-hydroxy compounds, polyesters having at least two OH groups in one molecule (polyester polyols), polyethers having at least two OH groups in one molecule (to be referred to as "polyether polyols" hereinafter), polycarbonates having at least two OH groups in one molecule (polycarbonate polyols), polycaprolactones having at least two OH groups in one molecules (polycaprolactone polyols) and acrylic polymers having at least two OH groups in one molecule (polyacrylic polyols).

Examples of these compounds are given below.

Aliphatic alcohols include ethylene glycol, diethylene glycol, propylene glycol, dipropylene glycol, butylene glycol, neopentyl glycol, glycerin, trimethylolethane, trimethylolpropane, butanetriol, 1,2-methyl glycoside, pentaerythritol, dipentaerythritol, tripentaerythritol, sorbitol, erythritol, threitol, ribitol, arabinitol, xylitol, allitol, mannitol, dorcitol, iditol, glycol, inositol, hexanetriol, triglycerol, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropyl cyclohexanol, tricyclo[5,2,1,0,2,6]decane-dimethanol, bicyclo[4,3,0]-nonanediol, dicyclohexanediol, tricyclo[5,3,1,1]dodecanediol, bicyclo[4,3,0]nonanedimethanol, tricyclo[5,3,1,1]dodecane-diethanol, hydroxypropyl tricyclo[5,3,1,1]dodecanol, spiro[3,4]octanediol, butyl cyclohexanediol, 1,1'-bicyclohexylidenediol, cyclohexanetriol, maltitol and lactitol.

Aromatic alcohols include dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxy phenanthrene, bisphenol A, bisphenol F, xylylene glycol and tetrabromobisphenol A.

Sulfur-containing polyols include bis-[4-(hydroxyethoxy)phenyl]sulfide, bis-[4-(2-hydroxypropoxy)phenyl]sulfide, bis-[4-(2,3-dihydroxypropoxy)phenyl]sulfide, bis-[4-(4-hydroxycyclohexyloxy)phenyl]sulfide and bis-[2-methyl-4-(hydroxyethoxy)-6-butylphenyl]sulfide.

Compounds obtained by adding three or less molecules on average per hydroxyl group of ethylene oxide and/or propylene oxide to the above sulfur-containing polyols include di-(2-hydroxyethyl)sulfide, bis(2-hydroxyethyl)disulfide, 1,4-dithiane-2,5-diol, bis(2,3-dihydroxypropyl)sulfide, tetrakis(4-hydroxy-2-thiabutyl)methane, bis(4-hydroxyphenyl)sulfone, tetrabromobisphenol S, tetramethylbisphenol S, 4,4'-thiobis(6-tert-butyl-3-methylphenol) and 1,3-bis(2-hydroxyethylthioethyl)-cyclohexane.

The polyester polyols include compounds obtained by a condensation reaction between a polyol and a polybasic acid.

The polyether polyols include compounds obtained by a reaction between a compound having at least two active hydrogen-containing groups in the molecule and an alkylene oxide and modified products thereof.

The polycaprolactone polyols include compounds obtained by the ring-opening polymerization of ε-caprolactone.

The polycarbonate polyols include compounds obtained by the phosgenation of at least one low-molecular weight polyol and compounds obtained by transesterification using ethylene carbonate, diethyl carbonate or diphenyl carbonate.

The polyacrylic polyols include compounds obtained by the copolymerization of an acrylic acid ester or methacrylic acid ester containing a hydroxyl group and a monomer copolymerizable with these esters.

(B3-2) Polythiol;

The polythiol is a compound having at least two SH groups in one molecule, and examples thereof include the following compounds.

Aliphatic polythiols include methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, tetrakis(mercaptomethyl)methane, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, bicyclo[2,2,1]hepta-exo-cis-2,3-dithiol, 1,1-bis(mercaptomethyl)cyclohexane, thiomalic acid bis(2-mercaptoethyl ester), 2,3-dimercaptosuccinic acid (2-mercaptoethyl ester), 2,3-dimercapto-1-propanol(2-mercaptoacetate), 2,3-dimercapto-1-propanol(3-mercaptoacetate), diethylene glycol bis(2-mercaptoacetate), diethylene glycol bis(3-mercaptopropionate), 1,2-dimercaptopropylmethyl ether, 2,3-dimercaptopropylmethyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), 1,4-bis(3-mercaptobutyryloxy)butane, 1,4-butanediol-bis(3-mercaptopropionate), 1,4-butanediol-bis(thioglycolate), 1,6-hexanediol-bis(thioglycolate), tetraethylene glycol bis(3-mercaptopropionate), trimethylolpropane tris(2-mercaptoacetate), trimethylolpropane tris(3-mercaptopropionate), trimethylolethane tris(3-mercaptobutyrate), trimethylolpropane tris(3-mercaptobutyrate), pentaerythritol tetrakis(2-mercaptoacetate), pentaerythritol tetrakis(3-mercaptopropionate), 1,2-bis(2-mercaptoethylthio)-3-mercaptopropane, dipentaerythritol hexakis(3-mercaptopropionate), pentaerythritol tetrakis(3-mercaptobutyrate), 1,4-bis(3-mercaptobutyryloxy)butane, trimethylolpropane tris(3-mercaptobutyrate), trimethylolethane tris(3-mercaptobutyrate), 1,2-bis[(2-mercaptoethyl)thio]-3-mercaptopropane, 2-meraptomethyl-1,3-propanedithiol, 2-mercaptomethyl-1,4-butanedithiol, 2,4,5-tris(mercaptomethyl)-1,3-dithiolane, 2,2-bis(mercaptomethyl)-1,4-butanedithiol, 4,4-bis(mercaptomethyl)-3,5-dithiaheptane-1,7-dithiol, 2,3-bis(mercaptomethyl)-1,4-butanedithiol, 2,6-bis(mercaptomethyl)-3,5-dithiaheptane-1,7-dithiol, 4-mercaptomethyl-1,8-dimercapto-3,6-dithiaoctane, 2,5-bismercaptomethyl-1,4-dithiane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane and 4-mercaptomethyl-1,8-dimercapto-3,6-dithiaoctane.

Aromatic polythiols include 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethoxy)benzene, 1,3-bis(mercaptomethoxy)benzene, 1,4-bis(mercaptomethoxy)benzene, 1,2-bis(mercaptoethoxy)benzene, 1,3-bis(mercaptoethoxy)benzene, 1,4-bis(mercaptoethoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethoxy)benzene, 1,2,4-tris(mercaptomethoxy)benzene, 1,3,5-tris(mercaptomethoxy)benzene, 1,2,3-tris(mercaptoethoxy)benzene, 1,2,4-tris(mercaptoethoxy)benzene, 1,3,5-tris(mercaptoethoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptoethyl)benzene, 1,2,3,5-tetrakis(mercaptomethoxy)benzene, 1,2,4,5-tetrakis(mercaptomethoxy)benzene, 1,2,3,4-tetrakis(mercaptoethoxy)benzene, 1,2,3,5-tetrakis(mercaptoethoxy)benzene, 1,2,4,5-tetrakis(mercaptoethoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracene dimethanethiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane and 1,4-bis(mercaptopropylthiomethyl)benzene.

Halogen substituted aromatic polythiols include 2,5-dichlorobenzene-1,3-dithiol, 1,3-di(p-chlorophenyl)propane-2,2-dithiol, 3,4,5-tribromo-1,2-dimercaptobenzene and 2,3,4,6-tetrachloro-1,5-bis(mercaptomethyl)benzene.

Heterocyclic polythiols include 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-sym-triazine and 1,3,5-tris(3-mercaptobutyryloxyethyl)-1,3,5-triazine-2,4,6(1H,3H,5H)-trione.

Aromatic polythiols containing a sulfur atom in addition to a mercapto group include 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, and the nucleus alkylated products of the above polythiols.

Aliphatic polythiols containing a sulfur atom in addition to a mercapto group include bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)

propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris (2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, bis(mercaptomethyl)disulfide, bis(mercaptoethyl)disulfide and bis(mercaptopropyl)disulfide.

Thioglycolic acid or mercaptopropionic acid esters of the above compounds include hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(2-mercaptoacetate), 1,4-dithiane-2,5-diol bis(3-mercaptopropionate), 2,5-bis(mercaptomethyl)-1,4-dithiane, 2,5-bis(2-mercaptoethyl)-1,4-dithiane, 2,5-bis(3-mercaptopropyl)-1,4-dithiane, 2-(2-mercaptoethyl)-5-mercaptomethyl-1,4-dithiane, 2-(2-mercaptoethyl)-5-(3-mercaptopropyl)-1,4-dithiane, 2-mercaptomethyl-5-(3-mercaptopropyl)-1,4-dithiane, thioglycolic acid bis(2-mercaptoethyl ester), thiodipropionic acid bis(2-mercaptoethyl ester), 4,4'-thiodibutyric acid bis(2-mercaptoethyl ester), dithiodiglycolic acid bis(2-mercaptoethy ester), dithiodipropionic acid bis(2-mercaptoethyl ester), 4,4'-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester) and dithiodipropionic acid (2,3-dimercaptopropyl ester).

Heterocyclic polythiols containing a sulfur atom in addition to a mercapto group include 3,4-thiophenedithiol, tetrahydrothiophene-2,5-dimercaptomethyl and 2,5-dimercapto-1,3,4-thiadiazole Polythiols containing an isocyanurate group include 1,2-bis[(2-mercaptoethyl)thio]-3-mercaptopropane, tris-{(3-mercaptopropionyloxy)-ethyl}-isocyanurate, 1,3,5-tris(3-mercaptobutyryloxyethyl)-1,3,5-triazine-2,4,6(1H,3H,5H)-trione and tris-[(3-mercaptopropionyloxy)-ethyl]-isocyanurate.

(B3-3) Polyamine;

The polyamine is a compound having at least two NH$_2$ groups in one molecule, and examples thereof include the following compounds. The compounds include ethylenediamine, hexamethylenediamine, isophoronediamine, nonamethylenediamine, undecanemethylenediamine, dodecamethylenediamine, metaxylenediamine, 1,3-propanediamine, putrescine, 2-(2-aminoethylamino) ethanol, diethylenetriamine, p-phenylenediamine, m-phenylenediamine, melamine and 1,3,5-benzenetriamine.

(B3-4) Polyisocyanate;

The polyisocyanate is a compound having at least two NCO groups in one molecule, and examples thereof include the following compounds.

Aliphatic isocyanates include ethylene diisocyanate, trimethylene diisocyanate, tetramethylene diisocyanate, hexamethylene diisocyanate, octamethylene diisocyanate, nanomethylene diisocyanate, 2,2'-dimethylpentane diisocyanate, 2,2,4-trimethylhexamethylene diisocyanate, decamethylene diisocyanate, butene diisocyanate, 1,3-butadiene-1,4-diisocyanate, 2,4,4-trimethylhexamethylene diisocyanate, 1,6,11-undecatriisocyanate, 1,3,6-hexamethylene triisocyanate, 1,8-diisocyanato-4-isocyanatomethyloctane, 2,5,7-trimethyl-1,8-diisocyanato-5-isocyanatomethyloctane, bis(isocyanatoethyl)carbonate, bis(isocyanatoethyl)ether, 1,4-butylene glycol dipropyl ether-ω, ω'-diisocyanate, lysine diisocyanatomethyl ester, lysine triisocyanate, 2-isocyanatoethyl-2,6-diisocyanatohexanoate and 2-isocyanatopropyl-2,6-diisocyanatohexanoate.

Alicyclic isocyanates include isophorone diisocyanate, norbornane diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2'-dimethyldicyclohexylmethane diisocyanate, bis(4-isocyanato-n-butylidene)pentaerythritol, dimeric acid diisocyanate, 2-isocyanatomethyl-3-(3-isocyanatopropyl)-5-isocyanatomethy 1-bicyclo[2,2,1]-heptane, 2-isocyanatomethyl-3-(3-isocyanatopropyl)-6-isocyanatomethy 1-bicyclo[2,2,1]-heptane, 2-isocyanatomethyl-2-(3-isocyanatopropyl)-5-isocyanatomethy 1-bicyclo[2,2,1]-heptane, 2-isocyanatomethyl-2-(3-isocyanatopropyl)-6-isocyanatomethyl-bicyclo[2,2,1]heptane, 2-isocyanatomethyl-3-(3-isocyanatopropyl)-6-(2-isocyanatoet hyl)-bicyclo[2,2,1]-heptane, 2-isocyanatomethyl-3-(3-isocyanatopropyl)-6-(2-isocyanatoet hyl)-bicyclo[2,1,1]-heptane, 2-isocyanatomethyl-2-(3-isocyanatopropyl)-5-(2-isocyanatoet hyl)-bicyclo[2,2,1]-heptane, 2-isocyanatomethyl-2-(3-isocyanatopropyl)-6-(2-isocyanatoet hyl)-bicyclo[2,2,1]-heptane and 1,3,5-tris(isocyanatomethyl)cyclohexane.

Aromatic isocyanates include xylylene diisocyanate, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethyl)diphenyl ether, bis(isocyanatoethyl)phthalate, mesitylene triisocyanate, 2,6-di(isocyanatomethyl) furan, phenylene diisocyanate, tolylene diisocyanate, ethyl phenylene diisocyanate, isopropyl phenylene diisocyanate, dimethyl phenylene diisocyanate, diethyl phenylene diisocyanate, diisopropyl phenylene diisocyanate, trimethylbenzene triisocyanate, benzene triisocyanate, naphthalene diisocyanate, methyl naphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenylmethane-4,6,4'-triisocyanate, 4-methyl-diphenylmethane-3,5,2',4',6'-pentaisocyanate, phenyl isocyanatomethyl isocyanate, phenyl isocyanatoethyl isocyanate, tetrahydronaphthylene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethyl carbazole diisocyanate and dichlorocarbazole diisocyanate.

Sulfur-containing aliphatic isocyanates include thiodiethyl diisocyanate, thiodipropyl diisocyanate, thiodihexyl diisocyanate, dimethyl sulfone diisocyanate, dithiodimethyl diisocyanate, dithiodiethyl diisocyanate, dithiodipropyl diisocyanate, dicyclohexylsulfide-4,4'-diisocyanate, 1-isocyanatomethylthia-2,3-bis(2-isocyanatoethylthia)propane, 1,2-bis(2-isocyanatoethylthio)ethane, 1,1,2,2-tetrakis(isocyanatomethylthio)ethane, 2,2,5,5-tetrakis(isocyanatomethylthio)-1,4-dithiane, 2,4-dithiapentane-1,3-diisocyanate, 2,4,6-trithiaheptane-3,5-diisocyanate, 2,4,7,9-tetrathiapentane-5,6-diisocyanate and bis(isocyanatomethylthio)phenyl methane.

Aliphatic sulfide-based isocyanates include bis[2-(isocyanatomethylthio)ethyl]sulfide.

Aromatic sulfide-based isocyanates include diphenyl sulfide-2,4'-diisocyanate, diphenyl sulfide-4,4'-diisocyanate, 3,3'-dimethoxy-4,4'-diisocyanatodibenzyl thioether, bis(4-isocyanatomethylbenzene)sulfide and 4,4'-methoxybenzenethioethylene glycol-3,3'-diisocyanate.

Aromatic disulfide-based isocyanates include diphenyl disulfide-4,4'-diisocyanate, 2,2'-dimethyl diphenyl disulfide-5,5'-diisocyanate, 3,3'-dimethyl diphenyl disulfide-5,5'-diisocyanate, 3,3'-dimethyl diphenyl disulfide-6,6'-diisocyanate, 4,4'-dimethyl diphenyl disulfide-5,5'-diisocyanate, 3,3'-dimethoxy diphenyl disulfide-4,4'-diisocyanate and 4,4'-dimethoxy diphenyl disulfide-3,3'-diisocyanate.

Aromatic sulfone-based isocyanates include diphenyl sulfone-4,4'-diisocyanate, diphenyl sulfone-3,3'-diisocyanate, benzylidene sulfone-4,4'-diisocyanate, diphenylmethane sulfone-4,4'-diisocyanate, 4-methyldiphenylmethane sulfone-2,4'-diisocyanate, 4,4'-dimethoxydiphenyl sulfone-3,3'-diisocyanate, 3,3'-dimethoxy-4,4'-diisocyanatodibenzyl sulfone, 4,4'-dimethyldiphenyl sufone-3,3'-diisocyanate, 4,4'-di-tert-butyldiphenyl sulfone-3,3'-diisocyanate, 4,4'-dimethoxybenzene ethylene disulfone-3,3'-diisocyanate and 4,4'-dichlorodiphenyl sulfone-3,3'-diisocyanate.

Sulfonic acid ester-based isocyanates include 4-methyl-3-isocyanatobenzene sulfonyl-4'-isocyanatophenol ester and 4-methoxy-3-isocyanatobenzene sulfonyl-4'-isocyanatophenol ester.

Aromatic sulfonic acid amide-based isocyanates include 4-methyl-3-isocyanatobenzene sulfonylanilide-3'-methyl-4'-isocyanate, dibenzene sulfonyl-ethylenediamine-4,4'-diisocyanate, 4,4'-dimethoxybenzene sulfonyl-ethylenediamine-3,3'-diisocyanate and 4-methyl-3-isocyanatobenzene sulfonylanilide-4-methyl-3'-isocyanate.

Sulfur-containing heterocyclic isocyanates include thiophene-2,5-diisocyanate, thiophene-2,5-diisocyanatomethyl, 1,4-dithiane-2,5-diisocyanate, 1,4-dithiane-2,5-diisocyanatomethyl, 1,3-dithiolane-4,5-diisocyanate, 1,3-dithiolane-4,5-diisocyanatomethyl, 1,3-dithiolane-2-methyl-4,5-diisocyanatomethyl, 1,3-dithiolane-2,2-diisocyanatoethyl, tetrahydrothiophene-2,5-diisocyanate, tetrahydrothiophene-2,5-diisocyanatomethyl, tetrahydrothiophene-2,5-diisocyanatoethyl and tetrahydrothiophene-3,4-diisocyanatomethyl.

Further, halogen substitutes, alkyl substitutes, alkoxy substitutes, nitro substitutes, polyhydric alcohol prepolymer type modified products, carbodiimide modified products, urea modified products, biuret modified products, and dimerization and trimerization reaction products of the above polyisocyanates may also be used.

(B3-5) Polyisothiocyanate;

The polyisothiocyanate is a compound having at least two NCS groups in one molecule, and examples thereof include the following compounds.

Aliphatic isothiocyanates include 1,2-diisothiocyanatoethane, 1,3-diisothiocyanatopropane, 1,4-diisothiocyanatobutane, 1,6-diisothiocyanatohexane and p-phenylene diisopropylidene diisothiocyanate Alicyclic isothiocyanates include cyclohexyl isothiocyanate and cyclohexane diisothiocyanate.

Aromatic isothiocyanates include phenyl isothiocyanate, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene diisocyanate, 4,4'-diisothiocyanato-1,1'-biphenyl, 1,1'-methylenebis(4-isothiocyanatobenzene), 1,1'-methylenebis(4-isothiocyanato2-methylbenzene), 1,1'-methylenebis(4-isothiocyanato3-methylbenzene), 1,1'-(1,2-ethanediyl)bis(4-isothiocyanatobenzene), 4,4'-diisothiocyanatobenzophenone, 4,4'-diisothiocyanato3,3'-dimethyl benzophenone, benzanilide-3,4'-diisothiocyanate, diphenyl ether-4,4'-diisothiocyanate and diphenylamine-4,4'-diisothiocyanate.

Heterocyclic isothiocyanates include 2,4,6-triisothiocyanatol,3,5-triazine.

Carbonyl isothiocyanates include hexanedioyl diisothiocyanate, nonanedioyl diisothiocyanate, carbonic diisothiocyanate, 1,3-benzenedicarbonyl diisothiocyanate, 1,4-benzenedicarbonyl diisothiocyanate and (2,2'-bipyridine)-4,4'-dicarbonyl diisothiocyanate.

Further, polyfunctional isothiocyanates having at least one sulfur atom in addition to the sulfur atom of an isothiocyanate group may also be used. Examples of the polyfunctional isothiocyanates include the following compounds.

Sulfur-containing aliphatic isothiocyanates include thiobis(3-isothiocyanatopropane), thiobis(2-isothiocyanatoethane) and dithiobis(2-isothiocyanatoethane).

Sulfur-containing aromatic isothiocyanates include 1-isothiocyanato4-{(2-isothiocyanato)sulfonyl}benzene, thiobis(4-isothiocyanatobenzene), sulfonyl bis(4-isothiocyanatobenzene), sulfinyl bis(4-isothiocyanatobenzene), dithiobis(4-isothiocyanatobenzene), 4-isothiocyanatol-{(4-isothiocyanatophenyl)sulfonyl}-2-meth oxy-benzene, 4-methyl-3-isothiocyanatobenzene sulfonyl-4'-isothiocyanatophenyl ester and 4-methyl-3-isothiocyanatobenzene sulfonylanilide-3'-methyl-4'-isothiocyanate.

Sulfur-containing heterocyclic isothiocyanates include thiophene-2,5-diisothiocyanate and 1,4-dithiane-2,5-diisothiocyanate.

The above urethane-based polymerizable compounds (B3) may be used in combination to form a urethane bond or urea bond by polymerization.

(B4) Other Polymerizable Compounds;

In the present invention, besides the above-described polymerizable compounds (B1) to (B3), an episulfide-based polymerizable compound (B4-1) and a thietanyl-based polymerizable compound (B4-2) may be used to improve refractive index, and also a monofunctional polymerizable compound (B4-3) (excluding the above polymerizable compounds having one polymerizable group) may be used to improve photochromic properties. Further, a composite type polymerizable compound (B4-4) having different types of polymerizable groups in the molecule may also be used.

(B4-1) Episulfide-Based Polymerizable Compound;

This polymerizable monomer is a compound having at least two episulfide groups in the molecule and preferred especially when an SH group is introduced as a polymerizable functional group into the side chain of the photochromic polyrotaxane compound (A). Examples of the compound include the following compounds. Bis(1,2-epithioethyl)sulfide, bis(1,2-epithioethyl)disulfide, bis(2,3-epithiopropyl)sulfide, bis(2,3-epithiopropylthio)methane, bis(2,3-epithiopropyl)disulfide, bis(2,3-epithiopropyldithio)methane, bis(2,3-epithiopropyldithio)ethane, bis(6,7-epithio-3,4-dithiaheptyl)sulfide, bis(6,7-epithio-3,4-dithiaheptyl)disulfide, 1,4-dithiane-2,5-bis(2,3-epithiopropyldithiomethyl), 1,3-bis(2,3-epithiopropyldithiomethyl)benzene, 1,6-bis(2,3-epithiopropyldithiomethyl)-2-(2,3-epithiopropyl dithioethylthio)-4-thiahexane, 1,2,3-tris(2,3-epithiopropyldithio)propane, 1,1,1,1-tetrakis(2,3-epithiopropyldithiomethyl)methane, 1,3-bis(2,3-epithiopropyldithio)-2-thiapropane, 1,4-bis(2,3-epithiopropyldithio)-2,3-dithiabutane, 1,1,1-tris(2,3-epithiopropyldithio)methane, 1,1,1-tris(2,3-epithiopropyldithiomethylthio)methane, 1,1,2,2-tetrakis(2,3-epithiopropyldithio)ethane, 1,1,2,2-tetrakis(2,3-epithiopropyldithiomethylthio)ethane, 1,1,3,3-tetrakis(2,3-epithiopropyldithio)propane, 1,1,3,3-tetrakis(2,3-epithiopropyldithiomethylthio)propane, 2-[1,1-bis(2,3-epithiopropyldithio)methyl]-1,3-dithietane and 2-[1,1-bis(2,3-epithiopropyldithiomethylthio)methyl]-1,3-dithietane (B4-2) Thietanyl-Based Polymerizable Compound;

This polymerizable compound is a thietane compound which is effective when an SH group is introduced as a polymerizable functional group into the side chain of the photochromic polyrotaxane compound (A) and has at least two thietanyl groups in the molecule. Some of the thietanyl-based polymerizable compounds have an episulfide group together with a plurality of thietanyl groups and are listed in the above paragraph for the episulfide-based polymerizable compound. Other thietanyl-based polymerizable compounds include metal-containing thietane compounds having a metal atom in the molecule and non-metal thietane compounds containing no metal.

The non-metal thietane compounds include bis(3-thietanyl)disulfide, bis(3-thietanyl)sulfide, bis(3-thietanyl)trisulfide, bis(3-thietanyl)tetrasulfide, 1,4-bis(3-thietanyl)-1,3,4-trithiabutane, 1,5-bis(3-thietanyl)-1,2,4,5-tetrathiapentane, 1,6-bis(3-thietanyl)-1,3,4,6-tetrathiahexane, 1,6-bis(3-thietanyl)-1,3,5,6-tetrathiahexane, 1,7-bis(3-thietanyl)-1,2,4,5,7-pentathiaheptane, 1,7-bis(3-thietanylthio)-1,2,4,6,7-pentathiaheptane, 1,1-bis(3-thietanylthio)methane, 1,2-bis(3-thietanylthio)ethane, 1,2,3-tris(3-thietanylthio)propane, 1,8-bis(3-thietanylthio)-4-(3-thietanylthiomethyl)-3,6-dith iaoctane, 1,11-bis(3-thietanylthio)-4,8-bis(3-thietanylthiomethyl)-3,6,9-trithiaundecane, 1,11-bis(3-thietanylthio)-4,7-bis(3-thietanylthiomethyl)-3,6,9-trithiaundecane, 1,11-bis(3-thietanylthio)-5,7-bis(3-thietanylthiomethyl)-3,6,9-trithiaundecane, 2,5-bis(3-thietanylthiomethyl)-1,4-dithiane, 2,5-bis[[2-(3-thietanylthio)ethyl]thiomethyl]-1,4-dithiane, 2,5-bis(3-thietanylthiomethyl)-2,5-dimethyl-1,4-dithiane, bisthietanyl sulfide, bis(thietanylthio)methane3-[<(thietanylthio)methylthio>meth ylthio]thietane, bisthietanyl disulfide, bisthietanyl trisulfide, bisthietanyl tetrasulfide, bisthietanyl pentasulfide, 1,4-bis(3-thietanyldithio)-2,3-dithiabutane, 1,1,1-tris(3-thietanyldithio)methane, 1,1,1-tris(3-thietanyldithiomethylthio)methane, 1,1,2,2-tetrakis(3-thietanyldithio)ethane and 1,1,2,2-tetrakis(3-thietanyldithiomethylthio)ethane.

The metal-containing thietane compounds contain the group 14 element such as Sn atom, Si atom, Ge atom or Pb atom; the group 4 element such as Zr atom or Ti atom; the group 13 element such as Al atom; or the group 12 element such as Zn atom as the metal atom in the molecule. The following compounds are particularly preferably used.

Alkylthio(thietanylthio)tin's include methylthiotris(thietanylthio)tin, ethylthiotris(thietanylthio)tin, propylthiotris(thietanylthio)tin and isopropylthiotris(thietanylthio)tin.

Bis(alkylthio)bis(thietanylthio)tin's include bis(methylthio)bis(thietanylthio)tin, bis(ethylthio)bis(thietanylthio)tin, bis(propylthio)bis(thietanylthio)tin and bis(isopropylthio)bis(thietanylthio)tin.

Alkylthio(alkylthio)bis(thietanylthio)tin's include ethylthio(methylthio)bis(thietanylthio)tin, methylthio(propylthio)bis(thietanylthio)tin, isopropylthio(methylthio)bis(thietanylthio)tin, ethylthio(propylthio)bis(thietanylthio)tin, ethylthio(isopropylthio)bis(thietanylthio)tin and isopropylthio(propylthio)bis(thietanylthio)tin.

Bis(thietanylthio) cyclic dithiotin compounds include bis(thietanylthio)dithiastannetane, bis(thietanylthio)dithiastannolane, bis(thietanylthio)dithiastanninane and bis(thietanylthio)trithiastannocane.

Alkyl(thietanylthio)tin compounds include methyltris(thietanylthio)tin, dimethylbis(thietanylthio)tin, butyltris(thietanylthio)tin and tetrakis(thietanylthio)tin.

Compounds containing a metal other than tin include tetrakis(thietanylthio)germanium and tris(thietanylthio)bismuth.

(B4-3) Monofunctional Polymerizable Compound;

This polymerizable compound is a compound which has one OH group or SH group in the molecule and is used in combination with the above polyol to enhance photochromic properties by adjusting the molecular weight or the cross-linking degree. Examples of the monofunctional polymerizable compound include the following compounds. Polyethylene glycol monooleyl ether, polyethylene glycol monomethyl ether, polyoxyethylene lauryl ether, polyoxyethylene alkyl ether, polyoxyethylene2-ethylhexyl ether, polyoxyethylene tridecyl ether, polyoxyethylene cetyl ether, polyoxyethylene stearyl ether and polyethylene glycol mono-4-octylphenyl ether.

(B4-4) Composite Type Polymerizable Compound;

This polymerizable compound has different types of polymerizable groups in the molecule, and various physical properties can be adjusted by using this polymerizable compound.

Examples of this composite polymerizable compound include the following compounds.

Radical polymerization/OH type polymerizable compounds include 2-hydroxy methacrylate, 2-hydroxy acrylate, 2-hydroxypropyl acrylate and hydroxypropyl methacrylate.

Radical polymerization/isocyanate type polymerizable compounds include 2-isocyanatoethyl methacrylate and 2-isocyanatoethyl acrylate.

OH/SH type polymerizable compounds include 2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol pentakis(3-mercaptopropionate), hydroxymethyl-tris(mercaptoethylthiomethyl)methane, l-hydroxyethylthio-3-mercaptoethylthiobenzene, 4-hydroxy-4'-mercaptodiphenyl sulfone, 2-(2-mercaptoethylthio)ethanol, dihydroxyethyl sulfide mono(3-mercaptopropionate), dimercaptoethane mono(salicylate) and hydroxyethylthiomethyl-tris(mercaptoethylthio)methane Out of the above polymerizable compounds (B1) to (B4), preferably used polymerizable compounds are radically polymerizable compounds (B1) and urethane-based polymerizable compounds (B3) in the kneading method, radically polymerizable compounds (B1) in the lamination method, and urethane-based polymerizable compounds (B3) in the binder method.

(C) Polymerization-Curing Accelerator;

Various polymerization-curing accelerators may be used to accelerate the polymerization and curing of the photochromic composition of the present invention according to the types of the above-described polymerizable compound (B) and the polymerizable functional group introduced into the side chains of the photochromic polyrotaxane compound (A).

For example, when a radically polymerizable compound (B1) is used and a radically polymerizable functional group is introduced into the side chains of the photochromic polyrotaxane compound (A), a polymerization initiator (C1) is used as the polymerization-curing accelerator.

When a curable composition comprising an epoxy-based polymerizable compound (B2), an episulfide-based polymerizable compound (B4-1) and a thietanyl-based polymerizable compound (B4-2) is used and an epoxy group, episulfide group and thietanyl group are introduced as polymerizable functional groups into the side chains of the photochromic polyrotaxane compound (A), an epoxy curing agent (C2-1) and a cationic polymerization catalyst (C2-2) for the ring-opening polymerization of an epoxy group are used as the polymerization-curing accelerator.

Further, when an urethane-based polymerizable compound (B3) and the other polymerizable compound (B4) are used and OH group, SH group, $NH_2$ group, NCO group or NCS group is introduced as a polymerizable functional group into the side chains of the photochromic polyrotaxane compound (A), an urethane reaction catalyst (C3-1) or a condensation agent (C3-2) is used as the polymerization-curing accelerator.

(C1) Polymerization Initiator

Polymerization initiators are divided into thermopolymerization initiators and photopolymerization initiators, and examples thereof are given below.

As the thermopolymerization initiators, diacyl peroxides include benzoyl peroxide, p-chlorobenzoyl peroxide, decanoyl peroxide, lauroyl peroxide and acetyl peroxide.

Peroxy esters include t-butylperoxy-2-ethyl hexanoate, t-butylperoxy neodecanoate, cumylperoxy neodecanoate and t-butylperoxy benzoate.

Percarbonates include diisopropylperoxy dicarbonate and di-sec-butylperoxy dicarbonate.

Azo compounds include azobisisobutyronitrile and 2,2'-azobis(2,4-dimethylvaleronitrile).

As the photopolymerization initiators, acetophenone-based compounds include 1-phenyl-2-hydroxy-2-methyl-propan-1-one, 1-hydroxycyclohexylphenyl ketone and 1-(4-isopropylphenyl)-2-hydroxy-2-methylpropan-1-one.

α-dicarbonyl-based compounds include 1,2-diphenylethanedione and methylphenyl glycoxylate.

Acylphosphine oxide-based compounds include 2,6-dimethylbenzoyl diphenylphosphine oxide, 2,4,6-trimethylbenzoyl diphenylphosphine oxide, 2,4,6-trimethylbenzoyl diphenylphosphinic acid methyl ester, 2,6-dichlorobenzoyl diphenylphosphine oxide, 2,6-dimethoxybenzoyl diphenylphosphine oxide and phenylbis(2,4,6-trimethylbenzoyl) phosphine oxide.

When a photopolymerization initiator is used, a known polymerization-curing acceleration aid such as tertiary amine may be used in combination.

(C2-1) Epoxy Curing Agent

Amine compounds and salts thereof include 2-methylimidazole, 2-ethyl-4-methylimidazole, 1,8-diaza-bicyclo(5,4,0)-7-undecene, trimethylamine, benzyl dimethylamine, triethylamine, 2,4,6-tris(dimethylaminomethyl)phenol and 2-(dimethylaminomethyl)phenol.

Quaternary ammonium salts include tetramethylammonium chloride, benzyltrimethylammonium bromide and tetrabutylammonium bromide.

Organic phosphine compounds include tetra-n-butylphosphonium benzotriazoleate and tetra-n-butylphosphonium-o,o-diethylphosphorodithioate.

Metal carboxylic acid salts include chromium (III) tricarboxylate and tin octylate.

Acetylacetone chelate compounds include chromium acetylacetonate.

(C2-2) Cationic Polymerization Catalyst

Lewis acid-based catalysts include $BF_3$.amine complex, $PF_5$, $BF_3$, $AsF_5$ and $SbF_5$.

Thermosetting cationic polymerization catalysts include phosphonium salts, quaternary ammonium salts, sulfonium salts, benzylammonium salts, benzylpyridinium salts, benzylsulfonium salts, hydrazinium salts, carboxylic acid esters, sulfonic acid esters and amine imides.

Ultraviolet curable cationic polymerization catalysts include diaryl iodonium hexafluorophosphate and hexafluoroantimonic acid bis(dodecylphenyl)iodonium.

(C3-1) Urethane Reaction Catalyst

This reaction catalyst is used to form a poly(thio)urethane bond by a reaction between a polyiso(thio)cyanate and a polyol or polythiol.

Examples of the reaction catalyst are given below. Triethylenediamine, hexamethylenetetramine, N,N-dimethyloctylamine, N,N,N',N'-tetramethyl-1,6-diaminohexane, 4,4'-trimethylenebis(1-methylpiperidine), 1,8-diazabicyclo-(5,4,0)-7-undecene, dimethyltin dichloride, dimethyltin bis (isooctylthioglycolate), dibutyltin dichloride, dibutyltin dilaurate, dibutyltin maleate, dibutyltin maleate polymer, dibutyltin dilicinolate, dibutyltin bis(dodecylmercaptide), dibutyltin bis(isooctyl thioglycolate), dioctyltin dichloride, dioctyltin maleate, dioctyltin maleate polymer, dioctyltin bis(butyl maleate), dioctyltin dilaurate, dioctyltin dilicinolate, dioctyltin dioleate, dioctyltin di(6-hydroxy)caproate, dioctyltin bis(isooctyl thioglycolate) and didodecyltin dilicinolate. Metal salts such as copper oleate, copper acetylacetonate, iron acetylacetonate, iron naphthenate, iron lactate, iron citrate, iron gluconate, potassium octanoate and 2-ethylhexyl titanate are also included.

(C3-2) Condensation Agent

Inorganic acids include hydrogen chloride, hydrogen bromide, sulfuric acid and phosphoric acid.

Organic acids include p-toluenesulfonic acid and camphorsulfonic acid.

Acidic ion exchange resins include compounds obtained by introducing a sulfonate group into a styrene-divinylbenzene copolymer.

Carbodiimides include dicyclohexyl carbodiimide and 1-ethyl-3-(3-dimethylaminopyrrolyl)-carbodiimide.

(Blending Amount of Polymerization-Curing Accelerator (C))

The above polymerization-curing accelerators (C) may be used alone or in combination of two or more, and its amount may be so-called "catalytic amount". For example, the amount of the accelerator may be 0.001 to 10 parts by mass, specifically 0.01 to 5 parts by mass based on 100 parts by mass of the polymerizable compound (B).

Other Compounding Components in Curable Composition

As long as the effect of the present invention is not impaired, the curable composition of the present invention may comprise various compounding agents known per se, for example, stabilizers such as release agent, ultraviolet absorbent, infrared absorbent, ultraviolet stabilizer, antioxidant, coloring inhibitor, antistatic agent, fluorescent dye, dye, pigment and flavoring agent, additives, solvent, leveling agent and polymerization control agent such as a thiol exemplified by t-dodecyl mercaptan as required.

Especially when an ultraviolet stabilizer is used, it can improve the durability of the photochromic moiety advantageously. As the ultraviolet stabilizer, there are known hindered amine optical stabilizers, hindered phenol antioxidants and sulfur-based antioxidants. Particularly preferred ultraviolet stabilizers are given below. Bis(1,2,2,6,6-pentamethyl-4-piperidyl)sebacate, ADK STAB LA-52, LA-57, LA-62, LA-63, LA-67, LA-77, LA-82 and LA-87 of ADEKA Corporation, 2,6-di-tert-butyl-4-methyl-phenol, ethylenebis(oxyethylene)bis[3-(5-tert-butyl-4-hydroxy-m-tolyl)propionate], and IRGANOX 1010, 1035, 1075, 1098, 1135, 1141, 1222, 1330, 1425, 1520, 259, 3114, 3790, 5057 and 565 of CIBA SPECIALTY CHEMICALS INC.

Although the amount of the ultraviolet stabilizer is not particularly limited as long as the effect of the present invention is not impaired, it is generally 0.001 to 10 parts by mass, specifically 0.01 to 1 part by mass based on 100 parts by mass of the photochromic polyrotaxane compound. Especially when a hindered amine optical stabilizer is used, it is recommended to use the stabilizer in an amount of preferably 0.5 to 30 moles, more preferably 1 to 20 moles, much more preferably 2 to 15 moles based on 1 mole of the photochromic moiety in order to prevent the drift of adjusted developed color as the effect of improving durability differs according to the type of the photochromic moiety.

A photochromic compound other than the photochromic polyrotaxane compound (A) may be used as long as the effect of the present invention is not impaired.

<Preferred Composition of Curable Composition>

When the photochromic polyrotaxane compound of the present invention has a polymerizable group, a photochromic cured body can be obtained by polymerizing it alone.

The photochromic polyrotaxane compound (A) may be used in combination with the polymerizable compound (B).

In either case, the amount corresponding to the photochromic moiety is preferably set to 0.001 to 10 mass % based on 100 mass % of the total of the curable composition to obtain sufficiently high optical color density.

The amount corresponding to the photochromic moiety differs by the development system of photochromic properties. For example, to develop photochromic properties by the kneading method, the amount is preferably 0.001 to 2 mass %, particularly preferably 0.001 to 1 mass %, and to develop photochromic properties by the lamination method and the binder method, the amount is preferably 0.1 to 10 mass %, particularly preferably 1 to 7 mass %.

The blending ratio of the photochromic polyrotaxane compound (A) and the polymerizable compound (B) differs according to the number of side chains having the photochromic moiety contained in one molecule of the photochromic polyrotaxane.

When the number of side chains having the photochromic moiety contained in one molecule is 1 to 30, preferably, the photochromic polyrotaxane compound (A) is used in an amount of 0.5 to 80 mass % and the polymerizable compound (B) is used in an amount of 20 to 99.5 mass %, when the number of side chains having the photochromic moiety contained in one molecule is 30 to 300, preferably, the photochromic polyrotaxane compound (A) is used in an amount of 0.1 to 50 mass % and the polymerizable compound (B) is used in an amount of 50 to 99.9 mass %, and when the number of side chains having the photochromic moiety contained in one molecule is 300 or more, preferably, the photochromic polyrotaxane compound (A) is used in an amount of 0.01 to 20 mass % and the polymerizable compound (B) is used in an amount of 80 to 99.99 mass %.

Further, in the present invention, to develop the maximum effect of improving photochromic properties by the photochromic polyrotaxane compound (A), the above blending ratio should be suitably determined according to the type of the photochromic polyrotaxane compound (A) and the type of the polymerizable compound (B) in use.

When the polymerizable functional group to be introduced into the side chains of the photochromic polyrotaxane compound (A) is an acrylic group and/or methacrylic group, it is most appropriate to use a radically polymerizable compound (B1) in combination as the polymerizable compound (B).

As for the amount of the component (B1), when the hardness, mechanical properties and photochromic properties such as color optical density and fading speed of the obtained photochromic cured body are taken into consideration, preferably, the amount of the component (B1-1) is 80 to 100 mass % and the total amount of the components (B1-2), (B1-3) and (B1-4) is 0 to 20 mass % based on 100 mass % of the total of the components (B1-1), (B1-2), (B1-3) and (B1-4). Further, when the total amount of the components (B1-1) is 100 mass %, preferably, the amount of the component (B1-1-1) is 30 to 80 mass %, the amount of the component (B1-1-2) is 10 to 50 mass %, and the amount of the component (B1-1-3) is 0 to 20 mass %.

When the polymerizable functional group to be introduced into the side chains of the photochromic polyrotaxane compound (A) is an OH group and/or SH group, it is most appropriate to use a polyol (B3-1), polythiol (B3-2), polyamine (B3-3), polyisocyanate (B3-4) and polyisothiocyanate (B3-5) in combination so as to form a urethane bond, thiourethane bond, urea bond or thiourea bond (especially urethane bond or thiourethane bond).

In this case, it is recommended to set the amounts of the SH group and OH group to 0.8 to 1.2 moles, particularly preferably 0.85 to 1.15 moles, most preferably 0.9 to 1.1 moles based on 1 mol of the NCO group or NCS group.

<Use of Curable Composition>

When chains having a polymerizable group are introduced into the above photochromic polyrotaxane compound (A), only the photochromic polyrotaxane compound (A) may be used in the curable composition of the present invention. For example, a photochromic sheet (photochromic cured body) can be manufactured by molding the photochromic polyrotaxane compound (A).

A coating solution is prepared by dispersing or dissolving the above curable composition in an organic solvent and applied to a transparent optical sheet or optical film which is then dried to form a photochromic coating layer (photochromic cured body), thereby making it possible to develop photochromic properties.

In general, the curable composition of the present invention preferably comprises the polymerizable compound (B) and the polymerization-curing accelerator (C) in addition to the photochromic polyrotaxane compound (A). For example, it is desired that a photochromic composition should be prepared by melt kneading together these components and polymerized and cured to manufacture a photochromic cured body so as to develop photochromic properties therewith. While an example in which a curable composition comprising the polymerizable compound (B) is formed into a photochromic cured body will be explained below, even when only the photochromic polyrotaxane compound (A) into which chains having a polymerizable group have been introduced is used, the same method as that for curing the curable composition may be employed. The photochromic polyrotaxane compound (A) contained in the curable composition may have or may not have a polymerizable group.

Polymerization and curing for manufacturing a photochromic cured body are performed by carrying out radical polymerization, ring-opening polymerization, anionic polymerization or condensation polymerization by applying an active energy ray such as ultraviolet ray, α-ray, O-rayory-ray, heating or using both of them. That is, suitable polymerization means should be employed according to the types of the polymerizable compound (B) and the polymerization-curing accelerator (C) and the shape of a photochromic cured body to be formed.

To thermally polymerize the curable composition of the present invention comprising the polymerizable compound (B), temperature in particular affects the properties of the obtained photochromic cured body. Since this temperature condition is affected by the type and amount of the thermopolymerization initiator and the type of the polymerizable compound, it cannot be specified unconditionally. In general, a process in which polymerization is started at a relatively low temperature and then the temperature is raised slowly is preferred. Since the polymerization time differs according to various factors like temperature, the optimum time is preferably determined according to these conditions. In general, it is preferred to choose conditions under which polymerization is completed in 2 to 48 hours. To obtain a photochromic laminated sheet, it is preferred that polymerization should be carried out at a temperature at which a reaction between polymerizable functional groups proceeds and that the optimum temperature and the optimum time for obtaining a target molecular weight should be determined at that time.

To optically polymerize the curable composition of the present invention, among polymerization conditions, UV intensity in particular affects the properties of the obtained photochromic cured body. Since this illuminance condition is affected by the type and amount of the photopolymerization initiator and the types of the polymerizable monomers, it cannot be specified unconditionally. In general, it is preferred to elect conditions to ensure that 50 to 500 mW/cm$^2$ UV light having a wavelength of 365 nm should be applied for 0.5 to 5 minutes.

To develop photochromic properties by the kneading method using the above polymerization and curing, the above curable composition is injected into a space formed by a glass mold held by an elastomer gasket or a spacer and cast polymerized by heating in an air furnace or applying an active energy ray such as ultraviolet ray according to the types of the polymerizable compound (B) and the polymerization-curing accelerator, thereby making it possible to obtain a photochromic cured body which has been molded into an optical material such as a lens.

According to this method, a spectacle lens provided with photochromic properties is directly obtained.

To develop photochromic properties by the lamination method, a coating solution is prepared by dissolving the curable composition in a suitable organic solvent, applied to the surface of an optical substrate such as a lens substrate by spin coating or dipping and dried to remove the organic solvent, and then polymerization and curing are carried out by UV irradiation or heating in an inert gas such as nitrogen, thereby forming a photochromic layer composed of a photochromic cured body on the surface of the optical substrate (coating method).

The photochromic layer composed of a photochromic cured body can also be formed on the surface of the optical substrate by inner-mold cast polymerization in which an optical substrate such as a lens substrate is arranged opposed to a glass mold in such a manner that a predetermined space is formed therebetween and the curable composition is injected into the space to carry out polymerization-curing by UV irradiation or heating in this state (cast polymerization method).

When the photochromic layer is to be formed on the surface of the optical substrate by the above lamination method (coating method and cast polymerization method), adhesion between the photochromic layer and the optical substrate can be enhanced by subjecting the surface of the optical substrate to a chemical treatment with an alkaline solution or acidic solution, or a physical treatment by corona discharge, plasma discharge or polishing in advance. As a matter of course, a transparent adhesive resin layer may be formed on the surface of the optical substrate.

Further, to develop photochromic properties by the binder method, sheet molding is carried out by using the curable composition to form a photochromic sheet which is then sandwiched between two transparent sheets (optical sheets) and subjected to the above-described polymerization-curing, thereby obtaining a photochromic laminate including a photochromic layer as an adhesive layer.

In this case, the photochromic sheet can also be formed by means such as coating using a coating solution prepared by dissolving the curable composition in an organic solvent.

The photochromic laminate manufactured as described above is, for example, set in a mold and then a thermoplastic resin (such as polycarbonate) for an optical substrate such as a lens is injection molded to obtain an optical substrate such as a lens having a predetermined shape and provided with photochromic properties. This photochromic laminate may also be bonded to the surface of an optical substrate by an adhesive, thereby making it possible to obtain a photochromic lens.

When the photochromic laminate is to be manufactured as described above, it is preferred that a urethane- or urea-based polymerizable compound (B3), especially a urethane-based polymerizable compound should be used as the polymerizable compound (B) to form polyurethane as it has high adhesion to an optical substrate.

The above-described curable composition of the present invention can develop excellent photochromic properties such as color optical density and fading speed and is effectively used in the manufacture of an optical substrate provided with photochromic properties, for example, a photochromic lens without deteriorating characteristic properties such as mechanical strength.

According to use purpose, the photochromic layer and the photochromic cured body formed from the curable composition of the present invention may be subjected to a post-treatment such as dying with a dye such as a dispersion dye, the formation of a hard coat film by using a silane coupling agent or a hard coating agent comprising sol of silicon, zirconium, antimony, aluminum, tin or tungsten as the main component, the formation of a thin film by the vapor deposition of a metal oxide such as $SiO_2$, $TiO_2$ or $ZrO_2$, an antireflection treatment with a thin film formed by applying an organic polymer, or an antistatic treatment.

EXAMPLES

The following examples and comparative examples are provided for the purpose of further illustrating the present invention but are in no way to be taken as limiting. A description is first given of measuring instruments used in the present invention and the method of producing each component.

(Measurement of Molecular Weight; Gel Permeation Chromatography (GPC Measurement))

A liquid chromatograph (manufactured by Nihon Waters K.K.) was used as an apparatus for GPCmeasurement. The Showdex GPC KF-802 (elimination limit molecule quantity: 5,000), KF802.5 (elimination limit molecule quantity: 20,000), KF-803 (elimination limit molecule quantity: 70,000), KF-804 (elimination limit molecule quantity: 400,000) and KF-805 (elimination limit molecular quantity: 2,000,000) of Showa Denko K.K. were used as columns according to the molecular weight of a sample to be analyzed. Dimethyl formamide (DMF) was used as a developing solution to measure at a flow rate of 1 ml/min and a temperature of 40° C. Polystyrene was used as a reference standard to obtain the weight average molecular weight by comparative conversion. A differential refractometer was used as a detector.

Example 1

Synthesis of Photochromic Polyrotaxane Compound (PR1) Having Chains Containing a Photochromic Moiety First Step 1 L of toluene was added to 52.3 g (100 mmol) of a compound represented by the following formula (11) and synthesized by a method described in WO2005/028465 pamphlet,

[CF 18]

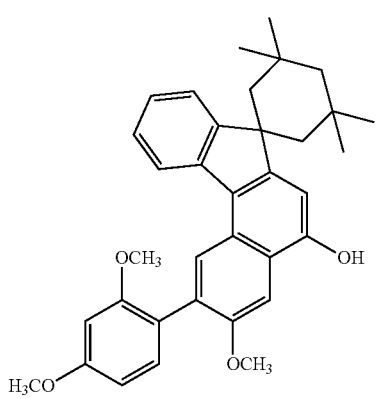

(11)

44.8 g (150 mmol) of a compound represented by the following formula (12)

[CF 19]

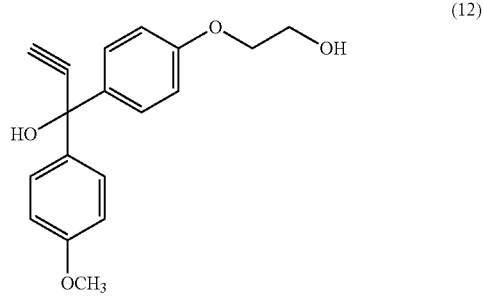

(12)

and 2.5 g (10 mmol) of pyridinium p-toluenesulfonate and heated at 75° C. under agitation for 2 hours. After the resulting solution was cooled to room temperature, it was rinsed with 1 L of water three times to distill off an organic layer under reduced pressure. The obtained residue was purified by silica gel column chromatography to obtain 48.2 g of a compound represented by the following formula (13).

[CF 20]

(13)

The yield was 60%.

Second Step

1 L of tetrahydrofuran (THF) was added to 48.2 g (60 mmol) of the compound represented by the above formula (13), 9.0 g (90 mmol) of succinic anhydride and 18.6 g (90 mmol) of dicyclohexyl carbodiimide and stirred at room temperature for 48 hours. After the precipitate was filtered out, THF was distilled off under reduced pressure, and the obtained residue was purified by silica gel chromatography to obtain 37.9 g (42 mmol) of a compound represented by the following formula (14).

[CF 21]

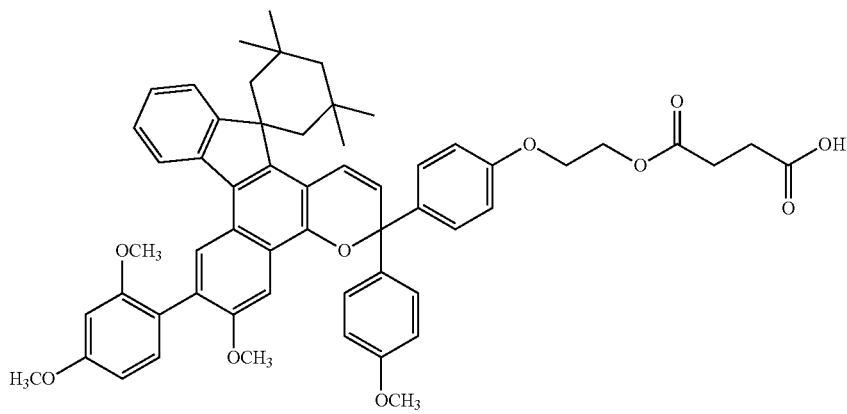

(14)

The yield was 70%.

Third Step

A polyrotaxane (pr1; Reference Example 1) having a structure that the chain part of the axial molecule was formed from polyethylene glycol having a molecular weight of 11,000, the bulky group at both terminals was an adamantly group, the cyclic molecules were α-cyclodextrin rings and 3.5 molecules on average of ε-caprolactone were ring-opening polymerized through a propyloxy group was synthesized in accordance with a method described in WO2013/099842 pamphlet. The characteristic properties of pr1 (Reference Example 1) are given below.

Inclusion amount of α-cyclodextrin: 0.25 Modification degree of side chains: 0.5 (50%) Molecular weight of side chain (molecular weight of first side chain): about 450 on average Weight average molecular weight Mw (GPC): 180,000

500 mL of THF was added to 10.0 g of the above compound (pr1; Reference Example 1), 4.8 g (5.3 mmol) of the compound represented by the above formula (14) and 2.1 g (10 mmol) of dicyclohexyl carbodiimide and stirred at room temperature for 120 hours. After the disappearance of the compound represented by the above formula (14) was confirmed by HPLC (high-speed liquid chromatography), the precipitate was filtered out. The obtained solution was added dropwise to hexane and the precipitated solid was collected and dried to obtain 12 g of a photochromic polyrotaxane compound (PR1) having side chains containing a photochromic moiety and represented by the following formula (15).

[CF 22]

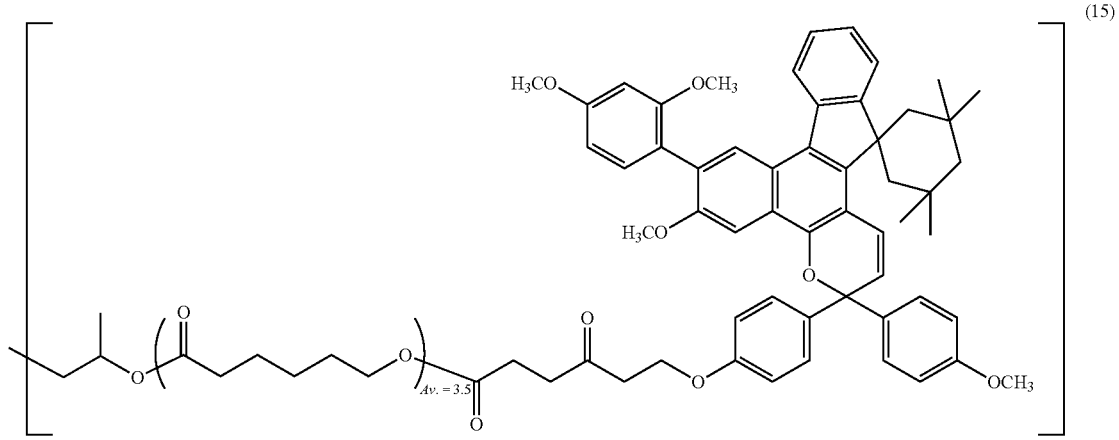

(15)

The characteristic properties of the obtained photochromic polyrotaxane compound (PR1) are given below. Inclusion amount of α-cyclodextrin: 0.25 Modification degree of side chains measured by 1H-NMR: 0.5 (50%) Molecular weight of first side chain: about 450 on average Molecular weight of side chain containing a photochromic moiety: about 610 on average (excluding photochromic moiety) Weight average molecular weight Mw (GPC): 270,000

It is understood from the above results that PR1 had a structure that the photochromic moiety was introduced into 35% of the side chains and 65% of the side chains had an OH group at the terminal. It is understood from the measurement results of 1H-NMR that about 100 chains having a photochromic moiety on average were introduced based on one molecule.

The characteristic properties of the obtained photochromic polyrotaxane compound (PR1) are shown in Table 1.

Example 2

Synthesis of Photochromic Polyrotaxane Compound (PR2) Having Chains Containing a Photochromic Moiety and Chains Containing an Acrylic Group as a Polymerizable Group After 10.0 g of (PR1) synthesized in Example 1 was dissolved in 50 mL of methyl ethyl ketone and 5 mg of dibutyl hydroxy toluene (polymerization inhibitor) was added to the resulting solution, 0.73 g (5.1 mmol) of 2-acryloyloxyethyl isocyanate was added dropwise to the resulting solution. 10 mg of dibutyltin dilaurate was added as a catalyst and heated at 70° C. under agitation for 4 hours. This solution was added dropwise to hexane, and the precipitated solid was collected and dried to obtain 10 g of a photochromic polyrotaxane compound (PR2) having chains containing a photochromic moiety represented by the above formula (15) and chains containing an acrylic group as a polymerizable group and represented by the following formula (16).

[CF 23]

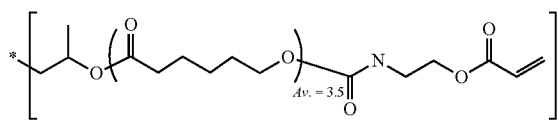

(16)

The characteristic properties of the obtained photochromic polyrotaxane compound (PR2) are given below.
Inclusion amount of α-cyclodextrin: 0.25
Modification degree of side chains: 0.5 (50%)
Molecular weight of first side chain: about 450 on average
Molecular weight of side chain containing a photochromic moiety: about 610 on average (excluding photochromic moiety)
Molecular weight of chain containing a polymerizable group (acrylic group): about 540 on average (excluding polymerizable group)
Weight Average Molecular Weight Mw (GPC): 290,000

It is understood from the above results that PR2 had a structure that the photochromic moiety was introduced into 35% of the side chains, the acrylic group was introduced as the polymerizable group into 50% of the side chains, and 15% of the side chains had an OH group at the terminal. It is also understood from the measurement result of $^1$H-NMR that about 100 chains having a photochromic moiety on average and about 140 chains having a polymerizable group (acrylic groups) on average were introduced based on 1 molecule.

The characteristic properties of the obtained photochromic polyrotaxane compound (PR2) are shown in Table 1.

Example 3

Synthesis of Photochromic Polyrotaxane Compound (PR3) Having Chains Containing a Photochromic Moiety 9 g of a photochromic polyrotaxane compound (PR3) having chains containing a photochromic moiety and represented by the above formula (16) was obtained in the same manner as in Example 1 except that 0.14 g (0.15 mmol) of the compound represented by the above formula (14) and 0.041 g (0.2 mmol) of dicyclohexyl carbodiimide were used.

The characteristic properties of the obtained photochromic polyrotaxane compound (PR3) are given below.
Inclusion amount of α-cyclodextrin: 0.25
Modification degree of side chains: 0.5 (50%)
Molecular weight of first side chain: about 450 on average
Molecular weight of chain containing a photochromic moiety: about 610 on average (excluding photochromic moiety)
Weight average molecular weight Mw (GPC): 180,000

It is understood from the above results that PR3 had a structure that the photochromic moiety was introduced into 1% of the side chains and 99% of the side chains had an OH group at the terminal. It is also understood from the measurement results of $^1$H-NMR that about 3 chains having a photochromic moiety on average were introduced based on 1 molecule.

The characteristic properties of the obtained photochromic polyrotaxane compound (PR3) are shown in Table 1.

Example 4

Synthesis of Photochromic Polyrotaxane Compound (PR4) Having Chains Containing a Photochromic Moiety and Chains Having an Epoxy Group as a Polymerizable Group 10.0 g of (PR3) synthesized in Example 3 was dissolved in 100 mL of tetrahydrofuran, and 0.97 g (10.4 mmol) of epichlorohydrin and 0.72 g (30 mmol) as a pure content of sodium hydroxide (oil matter was removed by cleaning with tetrahydrofuran) were added to the resulting solution and heated at 60° C. under agitation for 48 hours. After 100 mL of toluene was added, the solution was rinsed with 100 mL of water three times. This solution was added dropwise to hexane, and the precipitated solid was collected and dried to obtain 9 g of a photochromic polyrotaxane compound (PR4) having side chains containing a photochromic moiety and represented by the above formula (15) and side chains containing an epoxy group as a polymerizable group and represented by the following formula (17).

[CF 24]

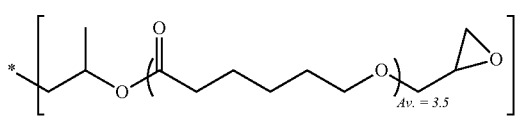

(17)

The characteristic properties of the obtained photochromic polyrotaxane compound (PR4) are given below.
Inclusion amount of α-cyclodextrin: 0.25
Modification degree of side chains: 0.5 (50%)
Molecular weight of first side chain: about 450 on average
Molecular weight of side chain containing a photochromic moiety: about 610 on average (excluding photochromic moiety)
Molecular weight of chain containing a polymerizable group (epoxy group): about 460 on average (excluding polymerizable group)
Weight average molecular weight Mw (GPC): 190,000

It is understood from the above results that PR4 had a structure that the photochromic moiety was introduced into 1% of the side chains, the epoxy group was introduced as a polymerizable group into 70% of the side chains, and 29% of the side chains had an OH group at the terminal. It is also understood from the measurement results of 1H-NMR that about 3 chains having a photochromic moiety on average were introduced and about 190 chains having a polymerizable group (epoxy groups) on average were introduced based on 1 molecule.

The characteristic properties of the obtained photochromic polyrotaxane compound (PR4) are shown in Table 1.

TABLE 1

| | Molecular weight of axis | Cyclic molecule | Number of clathrating cyclic molecules | Modification degree of cyclic molecules | Weight average molecular weight | Modification degree of side chains of cyclic molecules | |
|---|---|---|---|---|---|---|---|
| | | | | | | Percentage of chains containing photochromic moiety | Percentage of chains containing polymerizable group other than OH group |
| Ex. 1 PR1 | 11,000 | α-cyclo-dextrin | 0.25 | 0.5 | 270,000 | 35% | 0% |
| EX. 2 PR2 | 11,000 | α-cyclo-dextrin | 0.25 | 0.5 | 290,000 | 35% | 50% Acrylic group |
| EX. 3 PR3 | 11,000 | α-cyclo-dextrin | 0.25 | 0.5 | 180,000 | 1% | 0% |
| EX. 4 PR4 | 11,000 | α-cyclo-dextrin | 0.25 | 0.5 | 190,000 | 1% | 70% Epoxy group |
| R. Ex. 1 Pr1 | 11,000 | α-cyclo-dextrin | 0.25 | 0.5 | 180,000 | 0% | 0% |
| R. Ex. 2 Pr2 | 11,000 | α-cyclo-dextrin | 0.25 | 0.5 | 200,000 | 0% | 50% Acrylic group |

| | Modification degree of side chains of cyclic molecules | Number of chains based on one molecule polyrotaxane (average value) | | |
|---|---|---|---|---|
| | Percentage of chains having OH group at terminal | Number of chains containing photochromic moiety | Number of chains containing polymerizable group other than OH group | Number of chains having OH group at terminal |
| Ex. 1 PR1 | 65% | 100 | 0 | 180 |
| EX. 2 PR2 | 15% | 100 | 140 Acrylic group | 40 |
| EX. 3 PR3 | 99% | 3 | 0 | 280 |
| EX. 4 PR4 | 29% | 3 | 190 Epoxy group | 90 |
| R. Ex. 1 Pr1 | 100% | 0 | 0 | 280 |
| R. Ex. 2 Pr2 | 50% | 0 | 140 Acrylic group | 140 |

Ex.: Example
R. Ex.: Reference Example

Example 5

Preparation of Curable Composition (Y1 (May be Simply Referred to as (Y1) Hereinafter)) and Manufacture and Evaluation of Photochromic Cured Body
(Preparation of Curable Composition)

A photochromic curable composition (Y1) was prepared by fully mixing together components according to the following formulation.
Formulation;
(A) Photochromic Polyrotaxane Compound

| | |
|---|---|
| PR1 (produced in Example 1) | 7 parts by mass |

(B) Polymerizable Compound

| Component (B1-1-1-1) | |
|---|---|
| Polyethylene glycol dimethacrylate (average molecular weight of 736) | 45 parts by mass |
| Component (B1-1-1-1) | |
| Polyethylene glycol dimethacrylate (average molecular weight of 536) | 7 parts by mass |

-continued

| Component (B1-1-2-1) | |
|---|---|
| Trimethylolpropane trimethacrylate | 40 parts by mass |
| Component (B1-1-3) | |
| γ-methacryloyloxypropyl trimethoxysilane | 2 parts by mass |
| Glycidyl methacrylate | 1 part by mass |

(C) Polymerization-Curing Accelerator

| | |
|---|---|
| Phenylbis(2,4,6-trimethylbenzoyl)phosphine oxide (trade name; Irgacure819, manufactured by BASF) (polymerization initiator) | 0.3 part by mass |

(Other Compounding Agents)

| | |
|---|---|
| Bis(1,2,2,6,6-pentamethyl-4-piperidyl)sebacate (molecular weight of 508) (stabilizer) | 3 parts by mass |
| Ethylenebis(oxyethylene)bis[3-(5-tert-butyl-4-hydroxy-m-tol yl)propionate] (manufactured by CIBA SPECIALTY CHEMICALS INC., Irganox245) (stabilizer) | 3 parts by mass |
| Manufactured by Dow Corning Toray Co., Ltd., trade name; L7001 (leveling agent) | 0.1 part by mass |

The amount corresponding to the photochromic moiety was calculated as about 2 mass % based on 100 parts by mass of the total of the curable composition.

(Manufacture and Evaluation of Photochromic Laminate (Photochromic Cured Body))

A photochromic laminate was obtained by using the above curable composition (Y1) in accordance with the lamination method. The polymerization method is described below.

A thiourethane-based plastic lens having a center thickness of about 2 mm and a refractive index of 1.60 was first prepared as an optical substrate. This thiourethane-based plastic lens was subjected to 5 minutes of alkali etching at 50° C. by using a 10% sodium hydroxide aqueous solution and then fully rinsed with distilled water in advance.

A moisture-curable primer (trade name; TR—SC—P, manufactured by Tokuyama Corporation) was applied to the surface of the above plastic lens by using a spin coater (1H-DX2, manufactured by MIKASA) at 70 rpm for 15 seconds and then at 1,000 rpm for 10 seconds. Thereafter, about 2 g of the photochromic composition obtained above was spin coated at 60 rpm for 40 seconds and then at 600 rpm for 10 to 20 seconds to form a photochromic coating layer having a thickness of 40 μm.

The lens coated with the coating agent on the surface was exposed to light from a metal halide lamp having an output of 200 mW/cm$^2$ in a nitrogen gas atmosphere for 90 seconds to cure the coating film. Thereafter, the coating film was heated at 110° C. for 1 hour to manufacture a photochromic laminate having a photochromic layer.

The obtained photochromic laminate was used as a sample and exposed to light having a beam intensity at 365 nm of 2.4 mW/cm$^2$ on the surface of the polymer (photochromic coat layer) and at 245 nm of 24 μW/cm$^2$ with the L-2480 (300W) SHL-100 xenon lamp of Hamamatsu Photonics K.K. through an aero-mass filter (manufactured by Corning Incorporated) at 20° C.±1° C. for 120 seconds to develop color so as to measure the photochromic properties of the photochromic laminate. Photochromic properties and film physical properties such as Vickers' hardness were evaluated by the following methods and shown in Table 2.

Maximum Absorption Wavelength (λmax):

This is maximum absorption wavelength after color development obtained by the spectrophotometer (instantaneous multi-channel photodetector MCPD1000) of Otsuka Electronics Co., Ltd. The maximum absorption wavelength is connected with color at the time of color development.

Color Optical Density {ε(120)-ε(0)}:

Difference between absorbance {ε(120)} after 120 seconds of exposure to light at the above maximum absorption wavelength and absorbance ε(0) before exposure. It can be said that as this value becomes larger, photochromic properties become more excellent.

Fading Speed [T½ (Sec.)]:

Time elapsed until the absorbance at the above maximum absorption wavelength of a sample drops to ½ of {ε(120)-ε(0)} when exposure is continued for 120 seconds and then stopped. It can be said that as this time becomes shorter, photochromic properties become more excellent.

Vickers' Hardness

Vickers' hardness was measured with a hardness meter quipped with an automatic measuring (reading) device (PMT-X$^7$A of Matsuzawa Co., Ltd.). Stated more specifically, a Vickers indenter was pressed into the surface of a sample under a load of 10 gf for 30 seconds to obtain Vickers' hardness from indentation. The Vickers' hardness is an index which shows whether the sample is damaged in the step of processing a lens. When the Vickers' hardness is higher than 4.5, the sample is hardly damaged and when the Vickers' hardness is 4.5 or lower, the sample is easily damaged.

Cloudiness

The cloudiness of the molded photochromic laminate was visually evaluated under crossed nicols.

1: The sample has no problem as a product and is not clouded or almost not clouded.
2: The sample has no problem as a product but is slightly clouded.
3: Although the sample has no problem as a product, it is more clouded than 2.
4: The sample is clouded and cannot be used as a product.

Moldability

The optical distortion of the molded photochromic laminate was checked visually. It was evaluated based on the following criteria.

1: There is no optical distortion.
2: Optical distortion is partially seen in a lower half section of a lens.
3: Optical distortion is seen in an entire lens.

Example 6

Preparation of Curable Composition (Y2 (May be Simply Referred to as (Y2) Hereinafter))

A photochromic curable composition (Y2) was prepared in the same manner as in Example 5 except that 7 parts by mass of the photochromic polyrotaxane compound (PR2; manufactured in Example 2) obtained in Example 2 was used in place of 7 parts by mass of the photochromic polyrotaxane compound (PR1) obtained in Example 1.

When the total amount of this curable composition was 100 parts by mass, the amount corresponding to the photochromic moiety was calculated as about 2 mass %.

(Manufacture and Evaluation of Photochromic Laminate)

A photochromic laminate was obtained by the lamination method and evaluated in the same manner as in Example 5 except that the curable composition (Y2) was used. The results are shown in Table 2.

Example 7

Preparation of Curable Composition (Y3, May be Simply Referred to as (Y3) Hereinafter)

A curable composition was prepared by mixing together components according to the following formulation. The amounts of the components are shown below.

Formulation;
(A) Photochromic Polyrotaxane Compound

| | |
|---|---|
| PR3 (produced in Example 3) | 3 parts by mass |

(B) Polymerizable Compound

| Component (B3-2) | |
|---|---|
| DPMP: dipentaerythritol hexakis(3-mercaptopropionate) | 38 parts by mass |
| EGMP-4: tetraethylene glycol bis(3-mercaptopropionate) | 21 parts by mass |
| Component (B3-4) | |
| XDI: m-xylene diisocyanate | 38 parts by mass |

(C) Polymerization-Curing Accelerator

| DBTD: dibutyltin dilaurate (catalyst) | 0.1 part by mass |
|---|---|

(Other Compounding Agent)

| DBP: di-n-butyltin (release agent) | 0.3 part by mass |
|---|---|

When the total amount of this curable composition was 100 parts by mass, the amount corresponding to the photochromic moiety was calculated as about 0.04 mass %.

A photochromic cured body was obtained by using the above curable composition in accordance with the kneading method. The polymerization method is described below.

That is, after the above curable composition was fully defoamed, it was injected into a mold composed of a casting mold including glass molds subjected to a release treatment and a gasket made of an ethylene-vinyl acetate copolymer and having a thickness of 2 mm.

Then, the composition was cured over 15 hours while the temperature was gradually raised from 30° C. to 95° C. After the end of polymerization, the photochromic cured body was removed from the glass molds of the casting mold. The maximum absorption wavelength, color optical density, fading speed, cloudiness and moldability of the obtained photochromic cured body were evaluated in the same manner as in Example 5. The evaluation of L-scale Rockwell hardness was carried out as follows.

L-Scale Rockwell Hardness (HL):

After the above cured body was kept indoors at 25° C. for one day, the L-scale Rockwell hardness of the photochromic cured body was measured by using the Akashi Rockwell hardness meter (model: AR-10). The results are shown in Table 2.

Example 8

Preparation of Curable Composition (Y4, May be Simply Referred to as (Y4) Hereinafter)

A curable composition was prepared by mixing together components in accordance with the following formulation. The amounts of the components are given below.

Formulation:

(A) Photochromic Polyrotaxane Compound

| PR4 (produced in Example 4) | 3 parts by mass |
|---|---|

(B) Polymerizable Compound

| Component (B2) | |
|---|---|
| Neopentyl glycol diglycidyl ether | 74 parts by mass |
| Trimethylolpropane triglycidyl ether | 23 parts by mass |

(C) Polymerization-Curing Accelerator:

| Component (C2-1) | |
|---|---|
| 1,8-diaza-bicyclo(5,4,0)-7-undecene (initiator) | 3 parts by mass |

When the total amount of this curable composition was 100 parts by mass, the amount corresponding to the photochromic moiety was calculated as about 0.08 mass %.

A photochromic cured body was obtained by using the above curable composition in accordance with the kneading method. The polymerization method is described below.

That is, after the above curable composition was fully defoamed, it was injected into a mold composed of a casting mold including glass molds subjected to a release treatment and a gasket made of an ethylene-vinyl acetate copolymer and having a thickness of 2 mm.

Then, the composition was cured over 15 hours while the temperature was gradually raised from 30° C. to 110° C. After the end of polymerization, the photochromic cured body was removed from the glass molds of the casting mold.

The maximum absorption wavelength, color optical density, fading speed, cloudiness, moldability and L-scale Rockwell hardness were evaluated in the same manner as in Example 7. The results are shown in Table 2.

Reference Example 2

Synthesis of Polyrotaxane Compound Having Chains Containing a Polymerizable Group but No Chains Having a Photochromic Moiety After 10.0 g of the polyrotaxane compound (pr1 (Reference Example 1) produced in the third step of Example 1) used as the raw material compound in Example 1 was dissolved in 50 mL of methyl ethyl ketone and 5 mg of dibutyl hydroxytoluene (polymerization inhibitor) was added, 1.07 g (7.6 mmol) of 2-acryloyloxyethyl isocyanate was added dropwise to the resulting mixture. 10 mg of dibutyltin dilaurate was added as a catalyst and heated at 70° C. under agitation for 4 hours. This solution was added dropwise to hexane, and the precipitated solid was collected and dried to obtain 10 g of a polyrotaxane compound (pr2) having chains containing an acrylic group as a polymerizable group and represented by the above formula (16)

The characteristic properties of the obtained polyrotaxane compound (pr2) are given below.

Inclusion amount of α-cyclodextrin: 0.25

Modification degree of side chains: 0.5 (50%)

Molecular weight of side chain (first side chain): about 100 on average

Molecular weight of chain containing a polymerizable group (acrylic group): about 650 on average (excluding polymerizable group)
Weight average molecular weight Mw (GPC): 200,000

It is understood from the above results that pr2 had a structure that an acrylic group was introduced as a polymerizable group into 50% of the side chains and 50% of the side chains had an OH group at the terminal. It is also understood from the measurement results of $^1$H-NMR that about 140 chains having a polymerizable group (acrylic group) on average were introduced based on 1 molecule.

The characteristic properties of the obtained polyrotaxane compound (pr2) are shown in Table 1. The characteristic properties of the compound (pr1; Reference Example 1) produced in the third step of Example 1 are also shown in Table 1.

Comparative Example 1

Preparation of Curable Composition (Y1 (May be Simply Referred to as (Y1) Hereinafter)

A curable composition (y1) was prepared in the same manner as in Example 5 except that 5 parts by mass of the polyrotaxane compound (pr2) having chains containing an acrylic group as a polymerizable group obtained in Reference Example 2 was used in place of 7 parts by mass of the photochromic polyrotaxane compound (PR1) obtained in Example 1 and further 2 parts by mass of a photochromic compound represented by the following formula (18):

(Manufacture and Evaluation of Photochromic Laminate)

A photochromic laminate was obtained by the lamination method and evaluated in the same manner as in Example 5 except that the curable composition (y1) was used. The results are shown in Table 2.

Comparative Example 2

Preparation of Curable Composition (y2 (May be Simply Referred to as (y2) Hereinafter)

A photochromic curable composition (z2) was prepared in the same manner as in Example 7 except that 3 parts by mass of the polyrotaxane compound (pr1 (Reference Example 1) produced in the third step in Example 1) was used in place of 6 parts by mass of the photochromic polyrotaxane compound (PR3) obtained in Example 3 and further 0.04 part by mass of a photochromic compound represented by the above formula (18) was used as the other compounding agent.

(Manufacture and Evaluation of Photochromic Cured Body)

A photochromic cured body was obtained by the kneading method and evaluated in the same manner as in Example 7 except that the curable composition (y2) was used. The results are shown in Table 2.

TABLE 2

| | Polyrotaxane compound | Curable composition | Maximum Absorption wavelength | Color optical density | Fading speed | Vickers' hardness | Moldability | Rockwell hardness | Cloudness |
|---|---|---|---|---|---|---|---|---|---|
| Ex. 5 | PR1 | Y1 | 575 nm | 0.90 | 30 sec | 5.4 | 1 | — | 2 |
| Ex. 6 | PR2 | Y2 | 575 nm | 0.90 | 30 sec | 5.5 | 1 | — | 1 |
| Ex. 7 | PR3 | Y3 | 575 nm | 0.88 | 32 sec | — | 1 | 85 | 1 |
| Ex. 8 | PR4 | Y4 | 575 nm | 0.83 | 38 sec | — | 1 | 95 | 1 |
| C. Ex. 1 | Pr2 | y1 | 575 nm | 0.84 | 47 sec | 5.5 | 1 | — | 1 |
| C. Ex. 2 | Pr1 | y2 | 575 nm | 0.78 | 50 sec | — | 1 | 85 | 1 |

Ex.: Example
C. Ex.: Comparative Example

[CF 25]

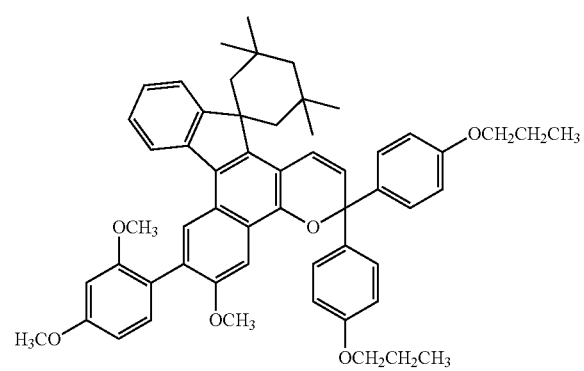

(18)

Was Used as the Other Compounding Agent.

As obvious from the above Examples and Comparative Examples, since the photochromic laminate or the photochromic cured body obtained by polymerizing the curable composition of the present invention makes it possible to arrange the photochromic moiety in the vicinity of the polyrotaxane compound, it has high color optical density and high fading speed.

Example 9

Synthesis of Photochromic Polyrotaxane Compound (PR5) Having Chains Containing a Photochromic Moiety Synthesis of Polyrotaxane Compound Production Example
First Step 100 mL of toluene was added to 4.7 g (10 mmol) a compound represented by the following formula (19),

[CF 26] (19)

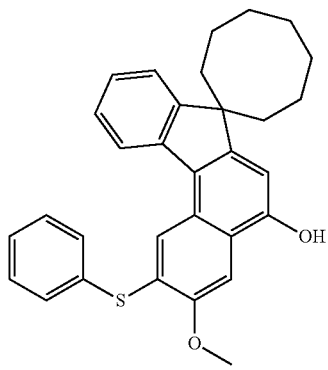

5.3 g (15 mmol) of a compound represented by the following formula (20)

[CF 27] (20)

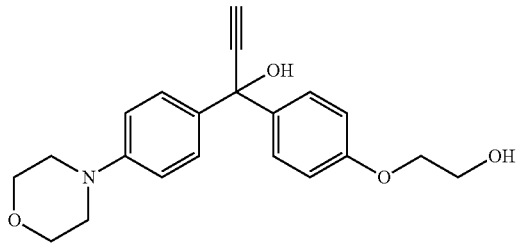

and synthesized in accordance with a method described in WO2006/022825 pamphlet and 0.25 (1 mmol) of pyridinium p-toluenesulfonate and heated at 75° C. under agitation for 1 hour. After the resulting solution was cooled to room temperature, it was rinsed with 100 mL of water three times to distill off an organic layer under reduced pressure. The obtained residue was purified by silica gel column chromatography to obtain 6.2 g of a compound represented by the following formula (21).

[CF 28] (21)

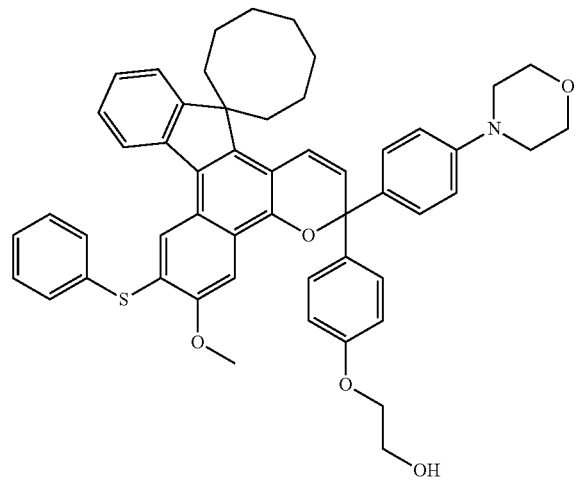

The yield was 77%.

Second Step 200 mL of dichloromethane was added to 6.2 g (7.7 mmol) of the compound represented by the above formula (21), 1.55 g (15.5 mmol) of succinic anhydride and 1.95 g (19.3 mmol) of triethylamine and stirred at room temperature for 12 hours. After the resulting solution was cooled with ice, 10% hydrochloric acid was added slowly until pH became 1 to carry out separation. The obtained solution was rinsed with 250 mL of water three times to distill off an organic layer under reduced pressure. The obtained residue was purified by silica gel chromatography to obtain 6.6 g (7.3 mmol) of a compound represented by the following formula (22).

[CF 29] (22)

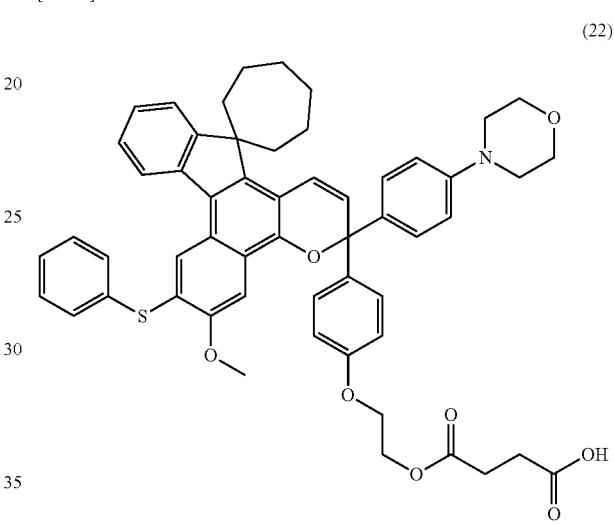

The yield was 95%.

Third Step A polyrotaxane compound (pr3; Reference Example 3) having a structure that the chain part of the axial molecule was formed from polyethylene glycol having a molecular weight of 2,000, the bulky group at both terminals was an adamantly group, the cyclic molecules were α-cyclodextrin rings and 8.5 molecules on average of a propyloxy group were introduced based on one molecule of α-cyclodextrin was synthesized in accordance with a method described in WO2013/099842 pamphlet. The characteristic properties of pr3 (Reference Example 3) are given below.

Inclusion amount of α-cyclodextrin: 50
Modification degree of side chains: 0.47 (47%)
Weight average molecular weight Mw (GPC): 19,000

10 mL of THF was added to 455 mg of the above compound (pr3; Reference Example 3), 280 mg (0.29 mmol) of the compound represented by the above formula (22) and 56 mg of dicyclohexyl carbodiimide and stirred at room temperature for 25 hours. After the disappearance of the compound represented by the above formula (22) was confirmed by TLC (thin layer chromatography), the precipitate was filtered out. The obtained solution was added dropwise to methanol, and the precipitated solid was collected and dried to obtain 488 mg of a photochromic polyrotaxane compound having side chains containing a photochromic moiety and represented by the following formula (23).

[CF 30]

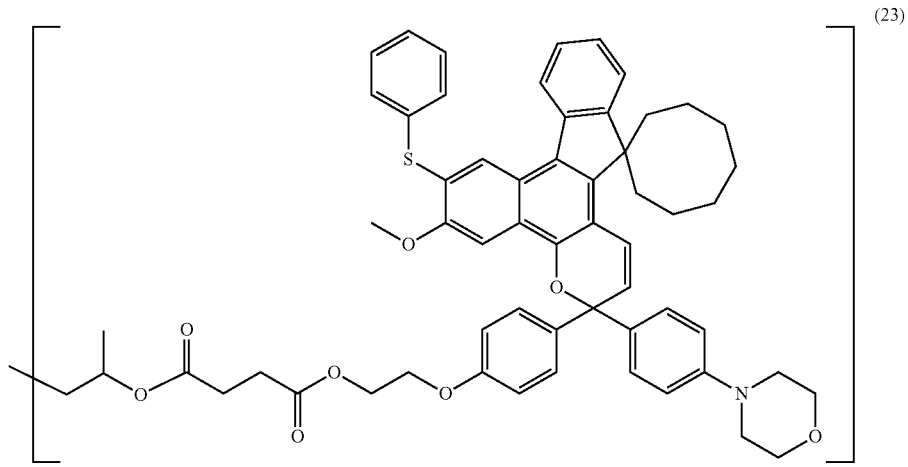

(23)

Subsequently, after 300 mg of the obtained photochromic polyrotaxane compound represented by the above formula (23), 77 mg of succinic anhydride and 0.11 ml of triethylamine were dissolved in 5.0 ml of dichloromethane and stirred at room temperature for 14 hours, 200 mg of polyethylene glycol monomethyl ether (Mw. of 550) and 70 mg of dicyclohexyl carbodiimide were added and stirred at room temperature for 18 hours. After the precipitate was filtered out, the reaction solution was added to 50 ml of methanol to precipitate a solid. The precipitate was collected by centrifugal separation and the obtained solid was washed with methanol and dried to obtain 141 mg of a photochromic polyrotaxane compound (PR5) into which polyethylene glycol monomethyl ether chains (first side chains (side chains)) represented by the following formula (24) were introduced.

[CF 31]

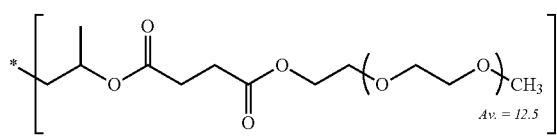

(24)

The characteristic properties of the obtained photochromic polyrotaxane compound (PR5) are given below.

Inclusion amount of α-cyclodextrin: 50

Modification degree of side chains: 0.47 (47%)

Molecular weight of first side chain: about 650 on average molecular weight of side chain containing a photochromic moiety: about 160 on average (excluding photochromic moiety)

Weight average molecular weight Mw (GPC): 76,000

It is understood from the above results that PR5 had a structure that the photochromic moiety was introduced into 35% of the side chains and polyethylene glycol monomethyl ether (first side chain) was introduced into 35% of the side chains. It is also understood from the measurement results of $^1$H-NMR that about 33 chains having a photochromic moiety on average were introduced based on one molecule.

The characteristic properties of the obtained photochromic polyrotaxane compound (PR5) are shown in Table 3.

TABLE 3

|  | Molecular weight of axis | Cyclic molecule | Number of clathrating cyclic molecules | Modification degree of cyclic molecules | Weight average molecular weight | Modification degree of side chains of cyclic molecules | |
|---|---|---|---|---|---|---|---|
|  |  |  |  |  |  | Percentage of chains containing photochromic moiety | Percentage of chains* containing polymerizable group other than OH group |
| Ex. 9 PR5 | 2,000 | α-cyclodextrin | 0.5 | 0.47 | 76,000 | 35% | 35% |
| R. EX. 3 Pr3 | 2,000 | α-cyclodextrin | 0.5 | 0.47 | 19,000 | 0% | 0% |

TABLE 3-continued

| | Modification degree of side chains of cyclic molecules | Number of chains based on one molecule polyrotaxane (average value) | | |
|---|---|---|---|---|
| | Percentage of chains** having OH group at terminal | Number of chains containing photochromic moiety | Number of chains* containing polymerizable group other than OH group | Percentage of chains** having OH group at terminal |
| Ex. 9 PR5 | 35% | 33 | 33 | 28 |
| R. EX. 3 Pr3 | 0% | 0 | 0 | 94 |

*Polyethylene glycol monomethyl ether (average number of recurring units of 12.5) chains
**Chains of propyloxy group
Ex.: Example,
R. Ex.: Reference Example Example 10

Preparation of Curable Composition (Y5, May be Simply Referred to as (Y5) Hereinafter) and Manufacture and Evaluation of Photochromic Cured Body (Preparation of Curable Composition)

A photochromic curable composition (Y5) was prepared by fully mixing together components in accordance with the following formulation.

Formulation;

(A) Photochromic polyrotaxane compound

PR5 (produced in Example 9) 10.9 mg (B) Polymerizable compound (B1-1-3) methyl methacrylate: 5.5 g (B4-4) hydroxypropyl methacrylate: 4.5 g (C) Polymerization-curing accelerator Azobisisobutyronitrile (polymerization initiator) 3.0 mg (Manufacture and Evaluation of Photochromic Cured Body)

A photochromic cured body was obtained by using the above curable composition (Y5) in accordance with the kneading method. The polymerization method is described below.

After the above curable composition (Y5) was fully defoamed, it was injected into a mold composed of a casting mold including glass molds subjected to a release treatment and a gasket made of an ethylene-vinyl acetate copolymer and having a thickness of 2 mm. Then, the composition was cured over 15 hours while the temperature was gradually raised from 30° C. to 95° C. After the end of polymerization, the photochromic cured body was removed from the glass molds of the casting mold.

The obtained photochromic cured body was evaluated in the same manner as in Example 7 (L-scale Rockwell hardness was not measured). The results are shown in Table 4.

Comparative Example 3

The same operation as in Example 10 was carried out except that the amount of the photochromic moiety was made the same as in Example 10 by using 4.0 mg of a photochromic compound represented by the following formula (25)

[CF 32]

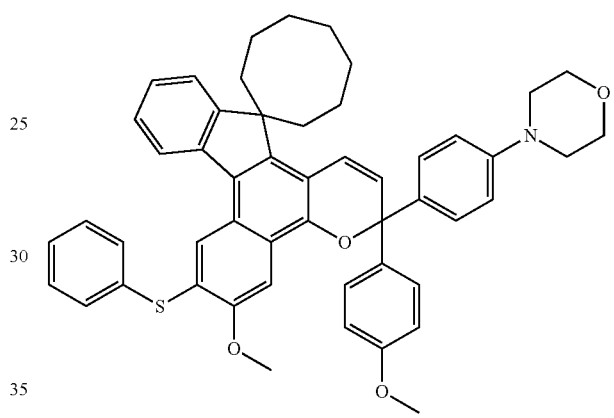

in place of the photochromic polyrotaxane compound (A) in Example 10, and the same evaluations as in Example 10 were made. The results are shown in Table 4.

Example 11

Preparation of Curable Composition (Y6 (May be Simply Referred to as (Y6) Hereinafter) and Manufacture and Evaluation of Photochromic Cured Body (Preparation of Curable Composition)

A photochromic curable composition (Y6) was prepared by fully mixing together components in accordance with the following formulation.

Formulation;

(A) Photochromic polyrotaxane compound PR5 (produced in Example 9) 10.9 mg (B) Polymerizable compounds (B1-1-4)norbornene methane diisocyanate: 4.58 g (B3-2) pentaerythritol tetrakis(3-mercaptopropionate): 5.42 g (C) Polymerization-curing accelerator (C3-1) dimethyltin dichloride 10 mg (Manufacture and Evaluation of Photochromic Cured Body)

A photochromic cured body was obtained by using the above curable composition (Y6) in accordance with the kneading method. The polymerization method is described below.

After the above curable composition (Y6) was fully defoamed, it was injected into a mold composed of a casting mold including glass molds subjected to a release treatment and a gasket made of an ethylene-vinyl acetate copolymer and having a thickness of 2 mm. Then, the composition was cured over 15 hours while the temperature was gradually raised from 30° C. to 95° C. After the end of polymerization, the photochromic cured body was removed from the glass molds of the casting mold.

The obtained photochromic cured body was evaluated in the same manner as in Example 10. The results are shown in Table 4.

Comparative Example 4

The same operation as in Example 11 was carried out except that the amount of the photochromic moiety was made the same as in Example 11 by using 4.0 mg of the photochromic compound used in Comparative Example 3 in place of the photochromic polyrotaxane compound (A) in Example 11, and the same evaluations as in Example 11 were made. The results are shown in Table 4.

TABLE 4

| | Polyrotaxane compound | Curable composition | Maximum Absorption wavelength | Color optical density | Fading speed | Moldability | Cloudness |
|---|---|---|---|---|---|---|---|
| Ex. 10 | PR5 | Y5 | 586 nm | 0.213 | 16.7 sec | 1 | 2 |
| C. Ex. 3 | pr3 | y5 | 586 nm | 0.127 | 20.7 sec | 1 | 2 |
| Ex. 11 | PR5 | Y6 | 582 nm | 0.078 | 14.1 sec | 1 | 1 |
| C. Ex. 4 | pr3 | y6 | 582 nm | 0.050 | 16.3 sec | 1 | 1 |

Ex.: Example
C. Ex.: Comparative Example

The invention claimed is:

1. A photochromic polyrotaxane compound which is a polyrotaxane compound comprising an axial molecule and a plurality of cyclic molecules clathrating the axial molecule, wherein a side chain containing a photochromic moiety is bonded to at least one of the cyclic molecules, and the cyclic molecules are cyclodextrin rings.

2. The photochromic polyrotaxane compound according to claim 1, wherein a side chain containing a polymerizable group is bonded to at least one of the cyclic molecules.

3. The photochromic polyrotaxane compound according to claim 1, wherein the side chain containing a photochromic moiety has at least an ether bond.

4. The photochromic polyrotaxane compound according to claim 2, wherein the group containing a polymerizable group has at least an ether bond.

5. The photochromic polyrotaxane compound according to claim 1, wherein the axial molecule includes a chain-like main chain and bulky groups at both ends, the chain-like main chain is formed from polyethylene glycol, and the bulky groups at both ends are adamantyl groups.

6. The photochromic polyrotaxane compound according to claim 1, wherein the photochromic moiety has at least one structure selected from the group consisting of naphthopyran, spirooxazine, spiropyran, fulgide, fulgimide and diarylethene.

7. The photochromic polyrotaxane compound according claim 1, wherein the photochromic moiety is indeno[2,1-f]naphtho[1,2-b]pyran.

8. The photochromic polyrotaxane compound according to claim 2, wherein the polymerizable group is at least one group selected from the group consisting of acrylic group, methacrylic group, allyl group, vinyl group, 4-vinylphenyl group, epoxy group, episulfide group, thietanyl group, OH group, SH group, $NH_2$ group, NCO group and NCS group.

9. The photochromic polyrotaxane compound according to claim 1, wherein the side chain containing a photochromic moiety is represented by the following formula (1):

[CF1]

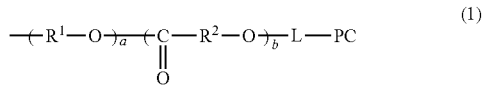

(1)

wherein PC is a photochromic group, $R^1$ is a linear or branched alkylene group having 2 to 8 carbon atoms, $R^2$ is a linear or branched alkylene group having 2 to 8 carbon atoms, linear or branched alkylene group having an acetyl group branch and 3 to 8 carbon atoms, or linear or branched alkylene group having an ether bond and 3 to 8 carbon atoms, L is represented by the following formula (2):

[CF2]

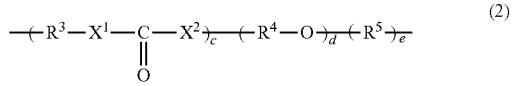

(2)

wherein $R^3$ is a single bond, linear or branched alkylene group having 1 to 20 carbon atoms, cycloalkyl group having 3 to 12 carbon atoms, or aromatic group having 6 to 12 carbon atoms, $R^4$ is a linear or branched alkylene group having 1 to 20 carbon atoms, cycloalkyl group having 3 to 12 carbon atoms, aromatic group having 6 to 12 carbon atoms, or dialkylsilyl group having a linear or branched alkyl group with 1 to 20 carbon atoms, le is a linear or branched alkylene group having 1 to 20 carbon atoms, cycloalkyl group having 3 to 12 carbon atoms, or aromatic group having 6 to 12 carbon atoms, $X^1$ and $X^2$ are each independently a single bond, O or NH, "c" is an integer of 0 to 50, "d" is an integer of 0 to 50, "e" is an integer of 0 or 1, when "c" is 2 or more, a "c" number of divalent groups may be the same or different, and when "d" is 2 or more, a "d" number of divalent groups may be the same or different, "a" is an integer of 1 to 50, "b" is an integer of 0 to 50, when "a" is 2 or more, an "a" number of divalent groups may be the same or different, and when "b" is 2 or more, a "b" number of divalent groups may be the same or different.

10. The photochromic polyrotaxane compound according to claim 2, wherein the side chain containing a polymerizable group is represented by the following formula (3):

[CF3]

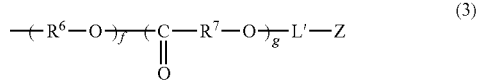

(3)

wherein Z is a polymerizable group, $R^6$ is a linear or branched alkylene group having 2 to 8 carbon atoms, $R^7$ is a linear or branched alkylene group having 2 to 8 carbon atoms, linear or branched alkylene group having an acetyl group branch and 3 to 8 carbon atoms, or linear or branched alkylene group having an ether bond and 3 to 8 carbon atoms, L' is represented by the following formula (2'):

[CF4]

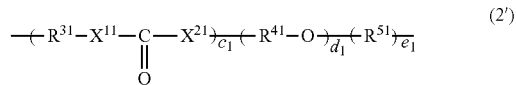

(2')

wherein $R^{31}$ is a single bond, linear or branched alkylene group having 1 to 20 carbon atoms, cycloalkyl group having 3 to 12 carbon atoms, or aromatic group having 6 to 12 carbon atoms, $R^{41}$ is a linear or branched alkylene group having 1 to 20 carbon atoms, cycloalkyl group having 3 to 12 carbon atoms, aromatic group having 6 to 12 carbon atoms, or dialkylsilyl group having a linear or branched alkyl group with 1 to 20 carbon atoms, $R^{51}$ is a linear or branched alkylene group having 1 to 20 carbon atoms, cycloalkyl group having 3 to 12 carbon atoms, or aromatic group having 6 to 12 carbon atoms, $X^{11}$ and $X^{21}$ are each independently a single bond, O or NH, "$c_1$" is an integer of 0 to 50, "$d_1$" is an integer of 0 to 50, "$e_1$" is an integer of 0 or 1, when "$c_1$" is 2 or more, a "$c_1$" number of divalent groups may be the same or different, and when "$d_1$" is 2 or more, a "$d_1$" number of divalent groups may be the same or different, "f" is an integer of 1 to 50, "g" is an integer of 0 to 50, when "f" is 2 or more, an "f" number of divalent groups may be the same, and when "g" is 2 or more, a "g" number of divalent groups may be the same or different.

11. The photochromic polyrotaxane compound according to claim 1, wherein the cyclic molecules are cyclodextrin rings, 1 to 100% of the side chains bonded to the cyclodextrin rings contain the photochromic moiety, and 0 to 99% of the side chains have the polymerizable group.

12. A curable composition comprising the photochromic polyrotaxane compound of claim 1 and a polymerizable compound other than the photochromic polyrotaxane compound.

13. The curable composition according to claim 12, wherein the polymerizable compound other than the photochromic polyrotaxane compound is a compound having at least one radically polymerizable group selected from the group consisting of acrylic group, methacrylic group, allyl group, vinyl group and 4-vinylphenyl group.

14. The curable composition according to claim 12, wherein the polymerizable compound other than the photochromic polyrotaxane compound is a compound having at least one polymerizable group selected from the group consisting of epoxy group, episulfide group and thietanyl group.

15. The curable composition according to claim 12, wherein the polymerizable compound other than the photochromic polyrotaxane compound is a compound having at least one polymerizable group selected from the group consisting of OH group, SH group, $NH_2$ group, NCO group and NCS group.

16. A photochromic cured body obtained by curing the photochromic polyrotaxane compound of claim 2.

17. A photochromic cured body obtained by curing the curable composition of claim 12.

18. The photochromic polyrotaxane compound according to claim 3, wherein the group containing a polymerizable group has at least an ether bond.

19. The photochromic polyrotaxane compound according to claim 2, wherein the cyclic molecules are cyclodextrin rings.

* * * * *